United States Patent
Dai et al.

(10) Patent No.: US 12,323,942 B2
(45) Date of Patent: Jun. 3, 2025

(54) PEER-TO-PEER SENSING ASSISTED BY RECONFIGURABLE INTELLIGENT SURFACES

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 17/303,957

(22) Filed: Jun. 10, 2021

(65) Prior Publication Data

US 2022/0400462 A1    Dec. 15, 2022

(51) Int. Cl.
  H04W 64/00    (2009.01)
  G01S 5/02     (2010.01)
  G01S 11/04    (2006.01)
  H01Q 15/14    (2006.01)

(52) U.S. Cl.
  CPC ......... *H04W 64/00* (2013.01); *G01S 5/02216* (2020.05); *G01S 11/04* (2013.01); *H01Q 15/14* (2013.01)

(58) Field of Classification Search
  None
  See application file for complete search history.

(56) References Cited

U.S. PATENT DOCUMENTS

| 7,907,080 B1 | 3/2011 | Zhang et al. |
| 2016/0050530 A1* | 2/2016 | Corbalis ............ G06Q 20/3278 |
| | | 455/456.1 |
| 2021/0160712 A1* | 5/2021 | Tadayon ............... H04W 36/16 |
| 2021/0235359 A1* | 7/2021 | Caporal Del Barrio ..................... |
| | | H04L 25/0212 |
| 2022/0014935 A1* | 1/2022 | Haija .................... H04L 5/0048 |
| 2022/0225118 A1* | 7/2022 | Pefkianakis ........ H04W 64/006 |
| 2022/0247480 A1* | 8/2022 | Papadopoulos ...... H04B 7/0626 |
| 2023/0176174 A1* | 6/2023 | Penna ................. G01S 5/02521 |
| | | 342/451 |

OTHER PUBLICATIONS

International Search Report and Written Opinion dated Jul. 5, 2022 from corresponding PCT Application No. PCT/US2022/071401.

(Continued)

*Primary Examiner* — Suhail Khan
(74) *Attorney, Agent, or Firm* — ArentFox Schiff LLP

(57) ABSTRACT

In an aspect of the disclosure, a method, a computer-readable medium, and an apparatus are provided. In some aspects, the apparatus may be a user equipment (UE) or a component thereof; however, in some other aspects, the apparatus may be a base station or a component thereof. The apparatus may be configured as a wireless node that configures an intermediary apparatus to reflect signals for the wireless node and another wireless node. The apparatus may be further configured to communicate a set of sensing signals with the other wireless node using the intermediary apparatus. The apparatus may be further configured to sense an object based on a set of measurements associated with the set of sensing signals.

27 Claims, 14 Drawing Sheets

(56) References Cited

OTHER PUBLICATIONS

Prasobh Sankar RS et al: "Joint Communication and Radar Sensing with Reconfigurable Intelligent Surfaces", arxiv.org, Cornell University Library, 201 Olin Library Cornell University Ithaca, NY 14853, May 5, 2021 (May 5, 2021), XP081958460, chapter Introduction, chapter System Model; figure 1, chapter Codebook Design for Localization.

Stefano Buzzi et al: "Foundations of MIMO Radar Detection Aided by Reconfigurable Intelligent Surfaces", arxiv.org, Cornell University Library, 201 Olin Library Cornell University Ithaca, NY 14853, May 19, 2021 (May 19, 2021), XP081966317, abstract; figure 1.

Henk Wymeersch et al: "Radio Localization and Mapping with Reconfigurable Intelligent Surfaces", arxiv.org, Cornell University Library, 201 Olin Library Cornell University Ithaca, NY 14853, Jun. 11, 2020 (Jun. 11, 2020), XP081681498, chapter Introduction, chapter Radio Localization and Mapping, p. 5, left-hand column, last paragraph.

\* cited by examiner

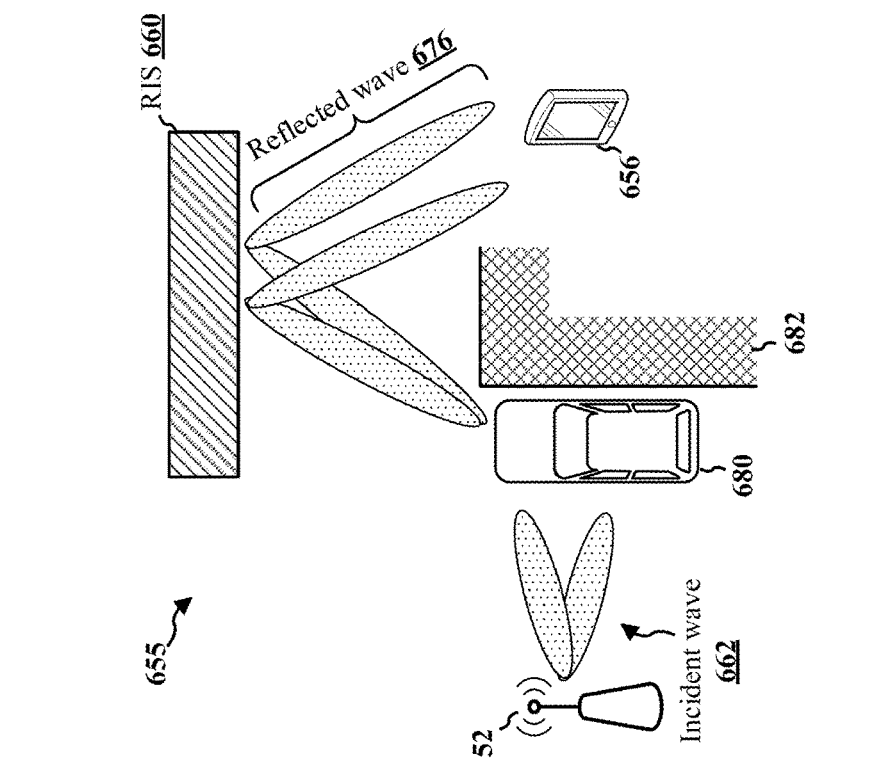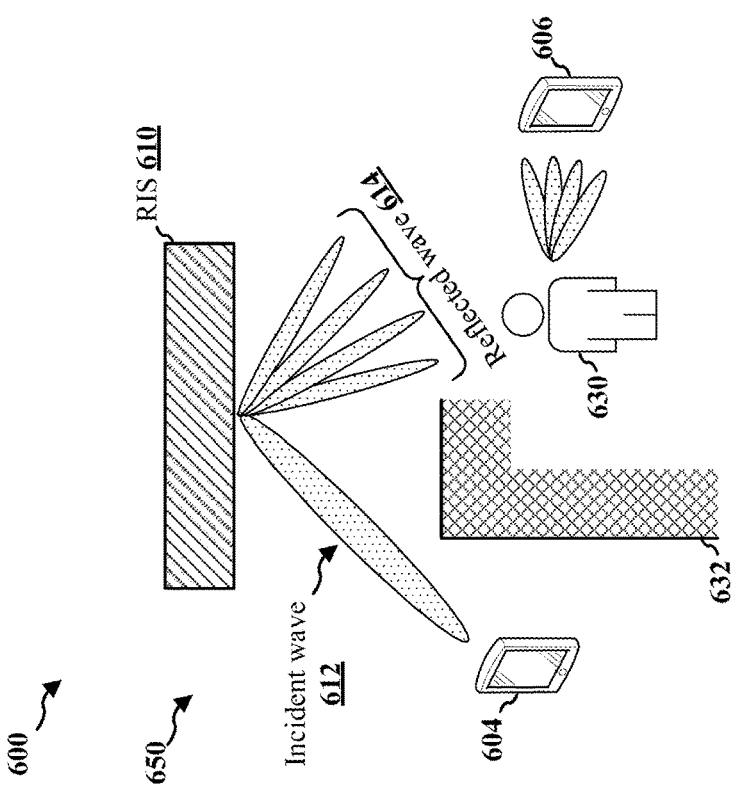
FIG. 6

PEER-TO-PEER SENSING ASSISTED BY RECONFIGURABLE INTELLIGENT SURFACES

BACKGROUND

Technical Field

The present disclosure generally relates to communication systems, and more particularly, to a wireless node that configures a surface to reflect waveforms in a direction of another wireless node or other object in the environment.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless nodes, such as base stations and user equipment (UE), may be configured with components that allow for sensing objects in the environment. For example, a wireless node may include an antenna element(s) with sensitivity, gain, etc. that is sufficient for bistatic sensing. Sensing objects distributed throughout an environment proximate to a wireless node may be useful in a variety of contexts, such as beamforming, Internet of Things (IoT) communication, mapping, safety, and so forth. For example, sensing objects in the an environment proximate to a vehicle may be useful in many vehicle-to-everything (V2X) contexts as a way to obtain real-time positions of other vehicles on a road, positions of pedestrians, and other objects that should generally be avoided when operating a vehicle. Regardless of node capabilities, object sensing may be significantly hampered by the absence of a line-of-sight (LOS) path to at least one other wireless node.

However, such object sensing may be improved through the use of reflective surfaces, which may provide non-LOS paths between wireless nodes, e.g., in mmW networks for object sensing, as well as other applications. However, simple reflective surfaces may not be positioned at a distance and/or angle to reflect waveforms that a wireless node finds useful. Therefore, a need exists for providing paths between wireless nodes that are less stochastic than ad hoc paths found with objects that may be a priori unknown.

The present disclosure provides various techniques and solutions for finding alternative paths to another device when an LOS path is at least partially blocked. Specifically, such paths may be available through reconfigurable intelligent surfaces (RISs), which may be deployed in many environments to reflect waveforms between devices, e.g., in millimeter wave (mmW) networks. An RIS may be an apparatus having a surface with controllable reflective elements distributed thereon. The present disclosure provides various mechanisms for configuring an RIS such that the RIS elements reflect incident radio waveforms in a desired direction, such as toward an intended receiver.

To that end, various aspects of the present disclosure enable an RIS to be controlled to reflect waveforms that maintain relatively higher spatial resolutions in comparison to other approaches, such as approaches in which the presence of unknown or random surfaces in an environment is presumed as at least one path between two devices. With increased accuracy and resolution through control and knowledge of waveform paths in an environment, some object sensing by a wireless node may be improved, including bistatic sensing.

In an aspect of the disclosure, a method, a computer-readable medium, and an apparatus are provided. In some aspects, the apparatus may be a user equipment (UE) or a component thereof; however, in some other aspects, the apparatus may be a base station or a component thereof. The apparatus may be configured as a wireless node that configures an intermediary apparatus to reflect signals for the wireless node and another wireless node. The apparatus may be further configured to communicate a set of sensing signals with the other wireless node using the intermediary apparatus. The apparatus may be further configured to sense an object based on a set of measurements associated with the set of sensing signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating example scenarios of sensing signal transmission using an RIS when a line-of-sight (LOS) path between a sensing node and an assistant node is at least partially occluded.

DETAILED DESCRIPTION

Figure 1:
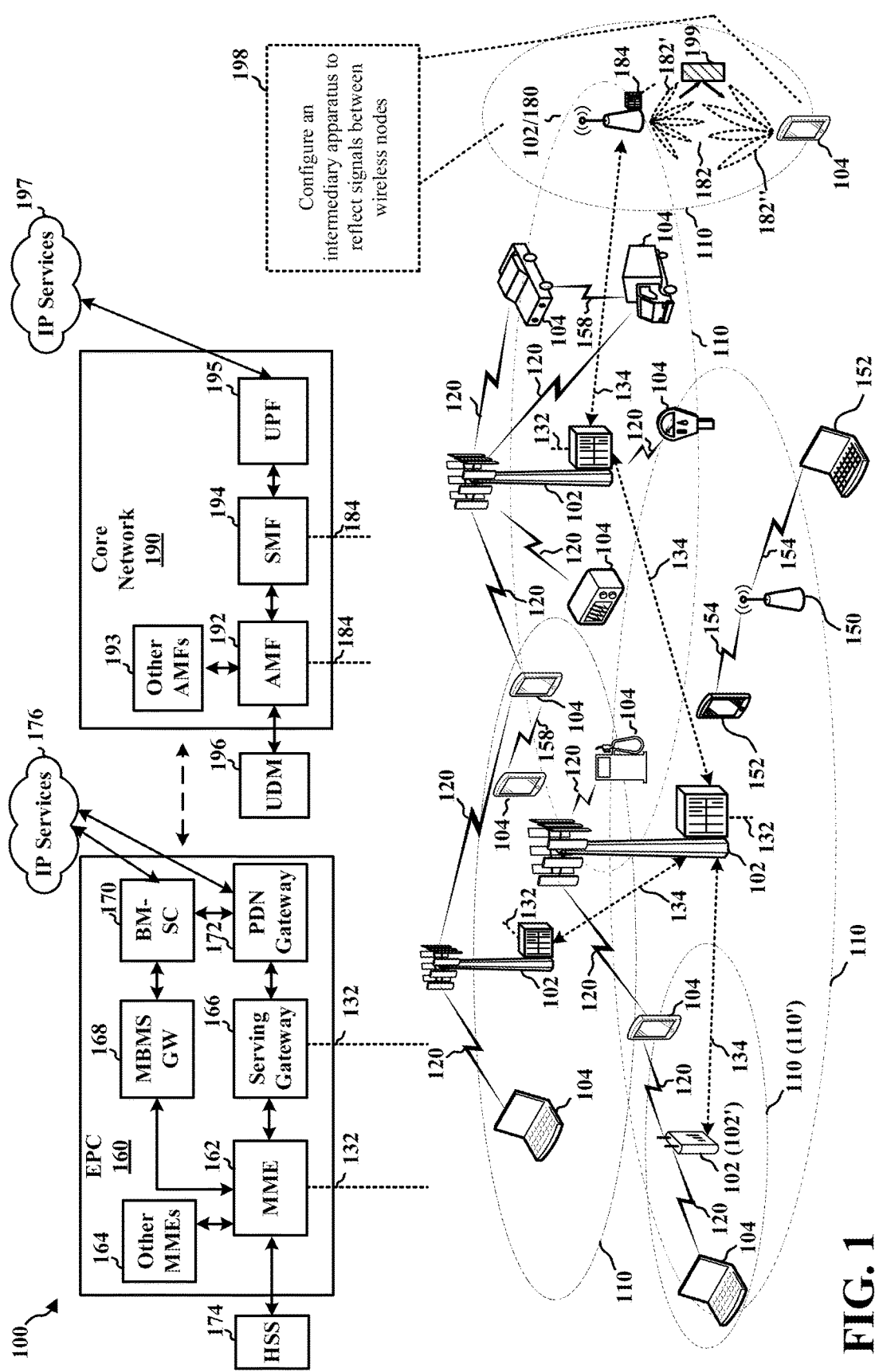
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, any person having ordinary skill in the art will recognize that these concepts and related aspects may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of a radio link control (RLC) layer.

Illustratively, some of the base stations 102 configured for IAB may communicate through a respective CU with a DU of an IAB donor node or other parent IAB node (e.g., a base station), and further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, a base station 102 operating as an IAB donor may provide a link to the one of the EPC 160 or the core network 190 for one or more UEs and/or other IAB nodes, which may be directly or indirectly connected (e.g., separated from an IAB donor by more than one hop) with the IAB donor. In the context of communicating with the EPC 160 or the core network 190, both the UEs and IAB nodes may communicate with a DU of an IAB donor. In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed sub scriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless and other radio links may be on one or more carriers, or component carriers (CCs). The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE is configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz)

which is identified by the International Telecommunications Union (ITU) as a "millimeter wave" band.

With the above aspects in mind, unless specifically stated otherwise, the term "sub-6 GHz," "sub-7 GHz," and the like, to the extent used herein, may broadly represent frequencies that may be less than 6 GHz, may be less than 7 GHz, may be within FR1, or may include mid-band frequencies. Further, unless specifically stated otherwise, the term "millimeter wave" and other similar references, to the extent used herein, may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

According to various aspects described herein, a reconfigurable intelligent surface (RIS) 199 may be deployed in the wireless communications system and access network 100. The RIS 199 may be configured to reflect waveforms in a desired direction, and potentially, with a desired spatial resolution. In so doing, the range and/or accuracy of some waveform operations may be improved, for example, when sensing objects in the environment.

Referring again to FIG. 1, in certain aspects, a wireless node, such as one of the UE 104 or the base station 102/180, may configure 198 an intermediary apparatus, such as the RIS 199, to reflect signals between the wireless node and another wireless node, such as the other of the UE 104 and the base station 102/180, e.g., for bistatic sensing.

The wireless node may communicate a set of sensing signals with the other wireless node using the intermediary apparatus (e.g., RIS 199). The wireless node may subsequently sense an object based on a set of measurements associated with the set of sensing signals.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
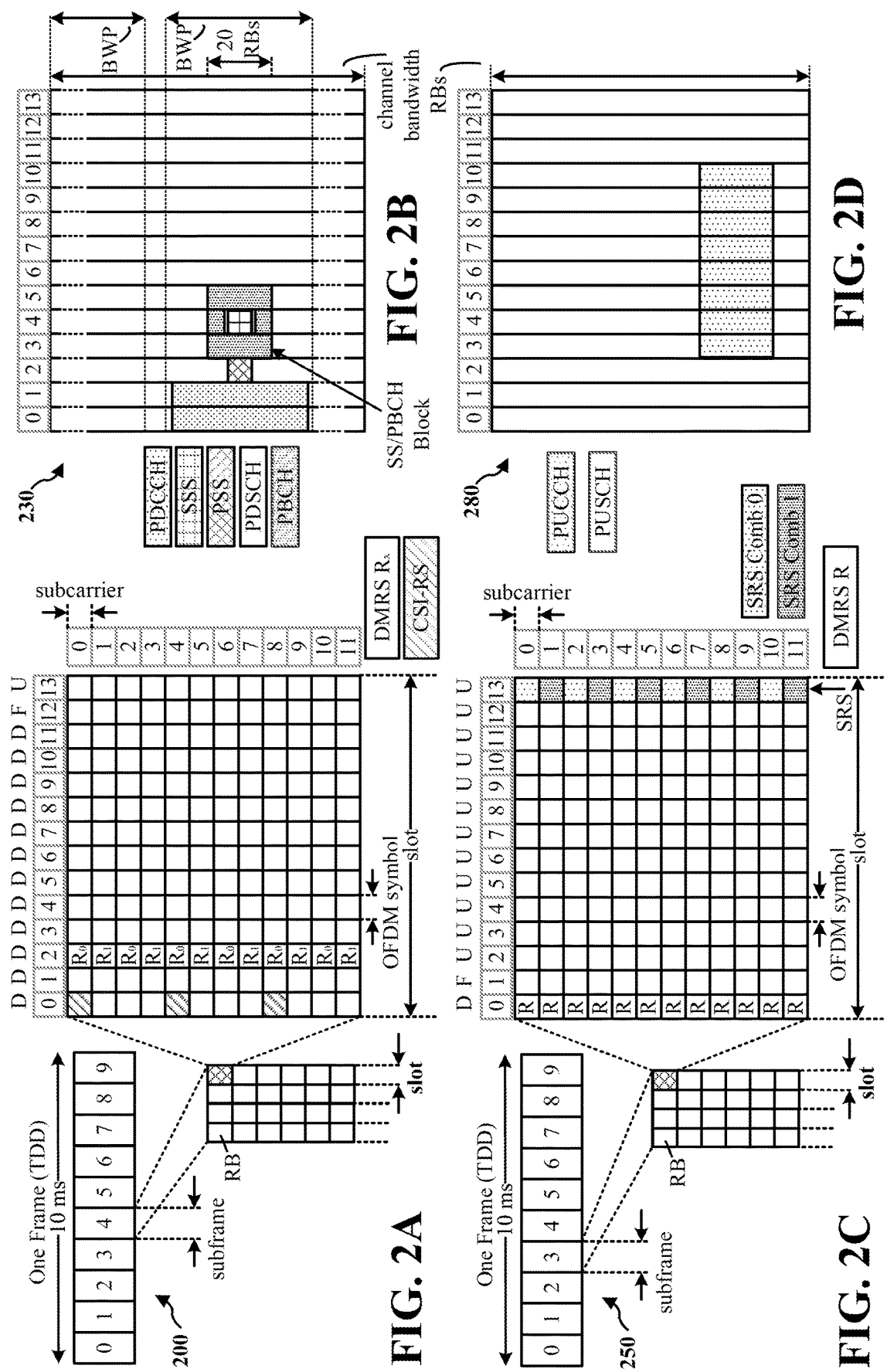
FIG. 2A is a diagram illustrating an example of a first frame, in accordance with various aspects of the present disclosure.
FIG. 2B is a diagram illustrating an example of downlink channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink channels within a subframe, in accordance with various aspects of the present disclosure.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
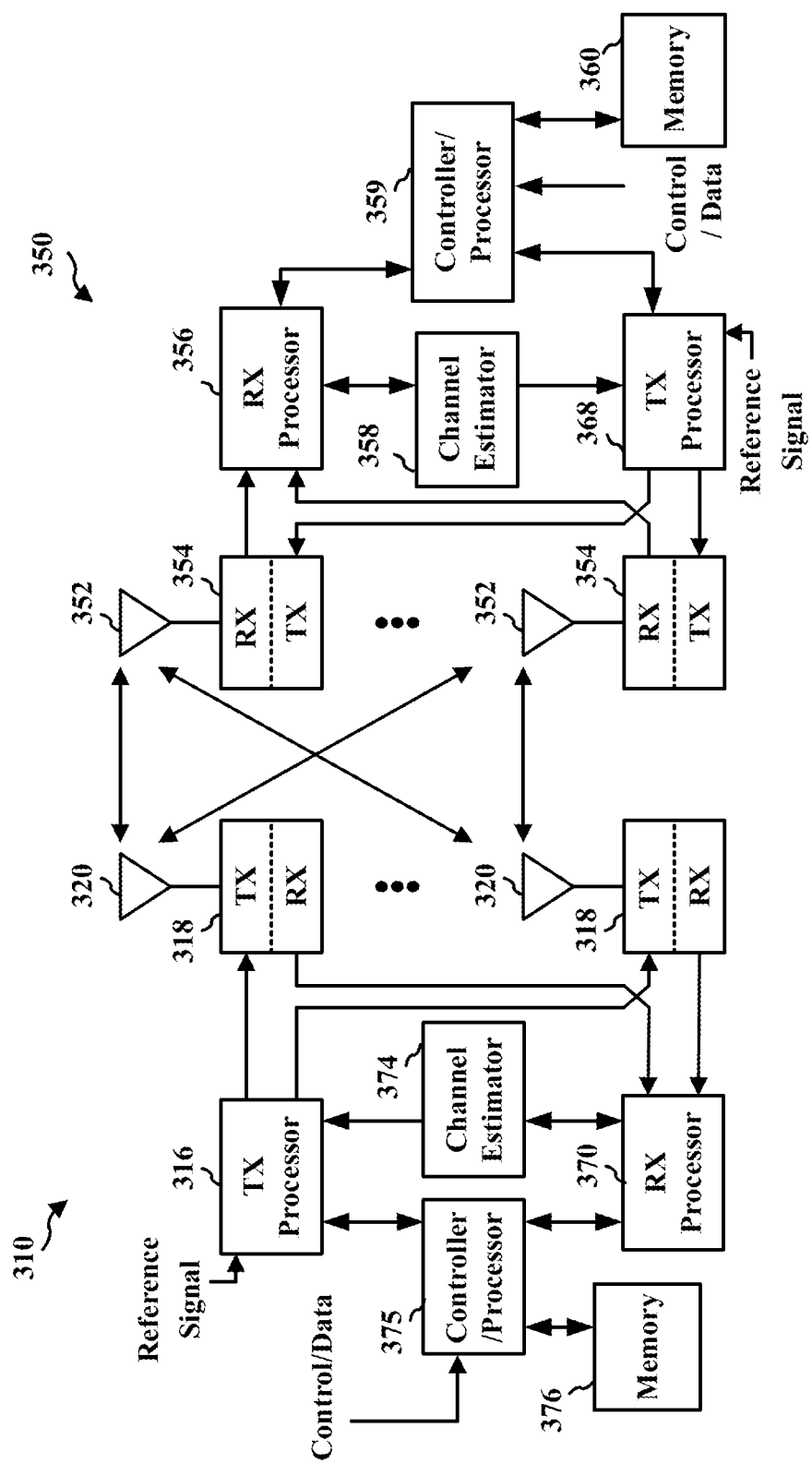
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through at least one respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through at least one respective antenna 320.

Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the configuration 198 of FIG. 1.

In some other aspects, at least one of the TX processor 316, the RX processor 370, and the controller/processor 375 may be configured to perform aspects in connection with the configuration 198 of FIG. 1.

Figure 4:
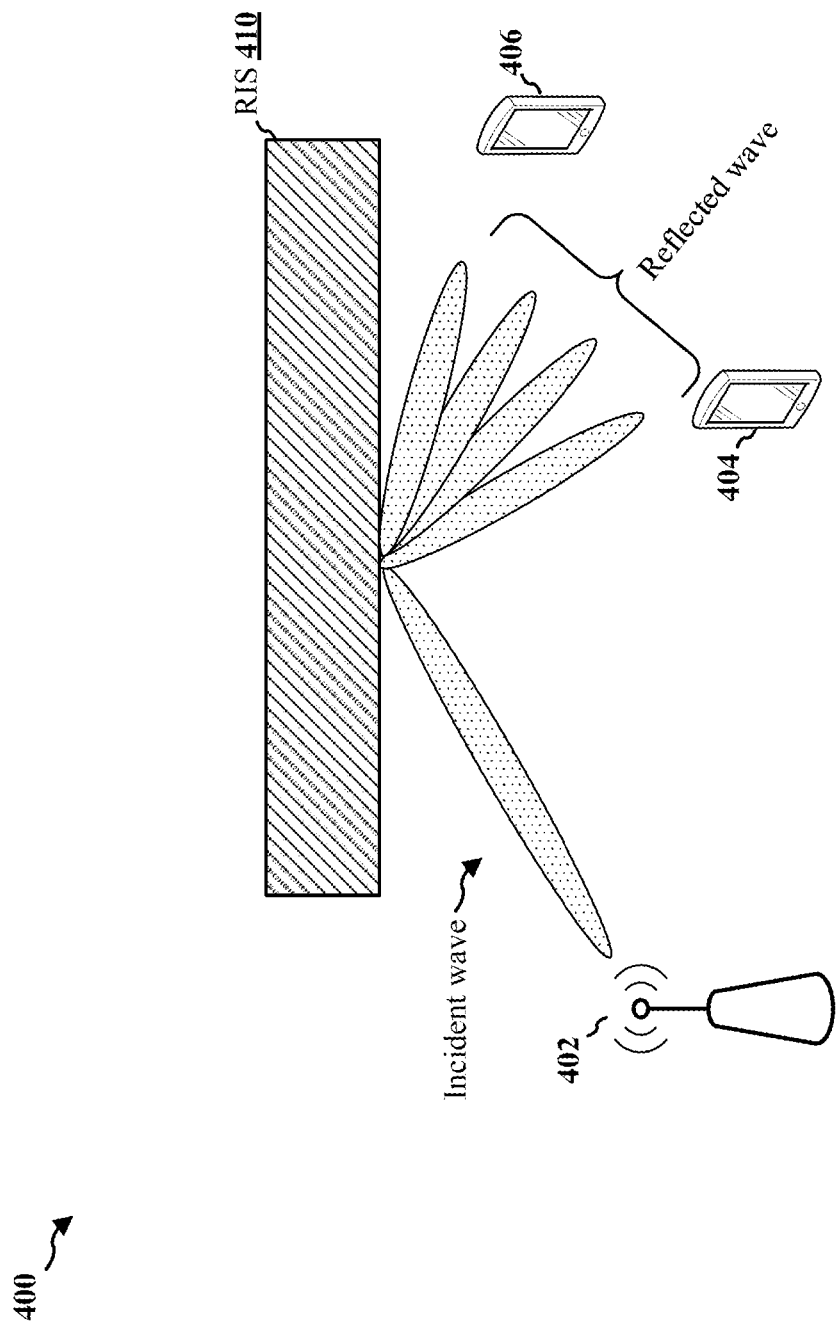
FIG. 4 is a diagram illustrating an example of beamformed communication between a base station and a UE using a reconfigurable intelligent surface (RIS).

FIG. 4 is a diagram 400 illustrating an example of beamformed communication between a base station 402 and UEs 404, 406 using an RIS 410. In some aspects, one or more of the base station 402 and the UEs 404, 406 may each be referred to as a respective wireless node.

According to various aspects described herein, the RIS 410 may be an apparatus having at least one surface with multiple electrically controllable reflective elements uniformly distributed thereon. Each of the electrically controllable reflective elements may include a reconfigurable electromagnetic characteristic, such as a reflection coefficient. By configuring different combinations of the reflective elements at the RIS 410, the RIS 410 may reflect and/or modify the incident waveforms in a controlled (or less stochastic) manner, such as by changing a direction of reflection, changing a beam width, etc.

The RIS 410 may be deployed in the wireless communications system and access network 100, and so may be compatible with various cellular systems, including LTE and 5G NR. In such deployments, the RIS 410 may deterministically (or controllably) alter channel realization so as to improve channel diversity, which may increase the robustness of some cellular communication. In particular, the increased channel diversity enabled through deployment of the RIS 410 may mitigate some channel blocking or fading, particularly in mmW ranges.

While wireless relay or repeater devices may provide some similar functionality, the RIS 410 may be less costly and/or more efficient than using such devices. For example, the RIS 410 may reflect and/or modify waveforms incident thereto without internally processing the signals carried thereon. Operation in this matter may avoid converting signals from analog to digital and/or otherwise transforming signals, which may reduce some latency while retaining some or all characteristics of the incident waveform originally transmitted by one of the base station 402 or UEs 404, 406.

Thus, the RIS 410 may provide one or more multi-path components detectable and/or combinable at a receiver. This (and other) feature of the RIS 410 may suggest that waveforms reflected by the RIS 410 are suitable to be applied in some sensing applications. For example, bistatic sensing may be implemented with the antenna elements of the base station or the UE 404, for example, if the reflective properties of the RIS 410 are known beforehand. However, nodes configured for bistatic sensing may first coordinate to some degree so that various calculations for obtaining ranging, positioning, imaging, etc. information is accurate.

While wireless relay or repeater devices may provide some similar functionality, the RIS 410 may be less costly and/or more efficient than using such devices. For example, the RIS 410 may reflect and/or modify waveforms incident thereto without internally processing the signals carried thereon. Operation in this matter may avoid converting signals from analog to digital and/or otherwise transforming signals, which may reduce some latency while retaining some or all characteristics of the incident waveform originally transmitted by one of the UEs.

Thus, the RIS 410 may provide one or more multi-path components detectable and/or combinable at a receiver. This (and other) feature of the RIS 410 may suggest that waveforms reflected by the RIS 410 are suitable to be applied in some sensing applications. For example, bistatic sensing may be implemented with the antenna elements of the base station 402 and/or UE 404, for example, if the reflective properties of the RIS 410 are known beforehand. However, nodes configured for bistatic sensing may first coordinate to some degree so that various calculations for obtaining ranging, positioning, imaging, etc. information is accurate.

Figure 5:
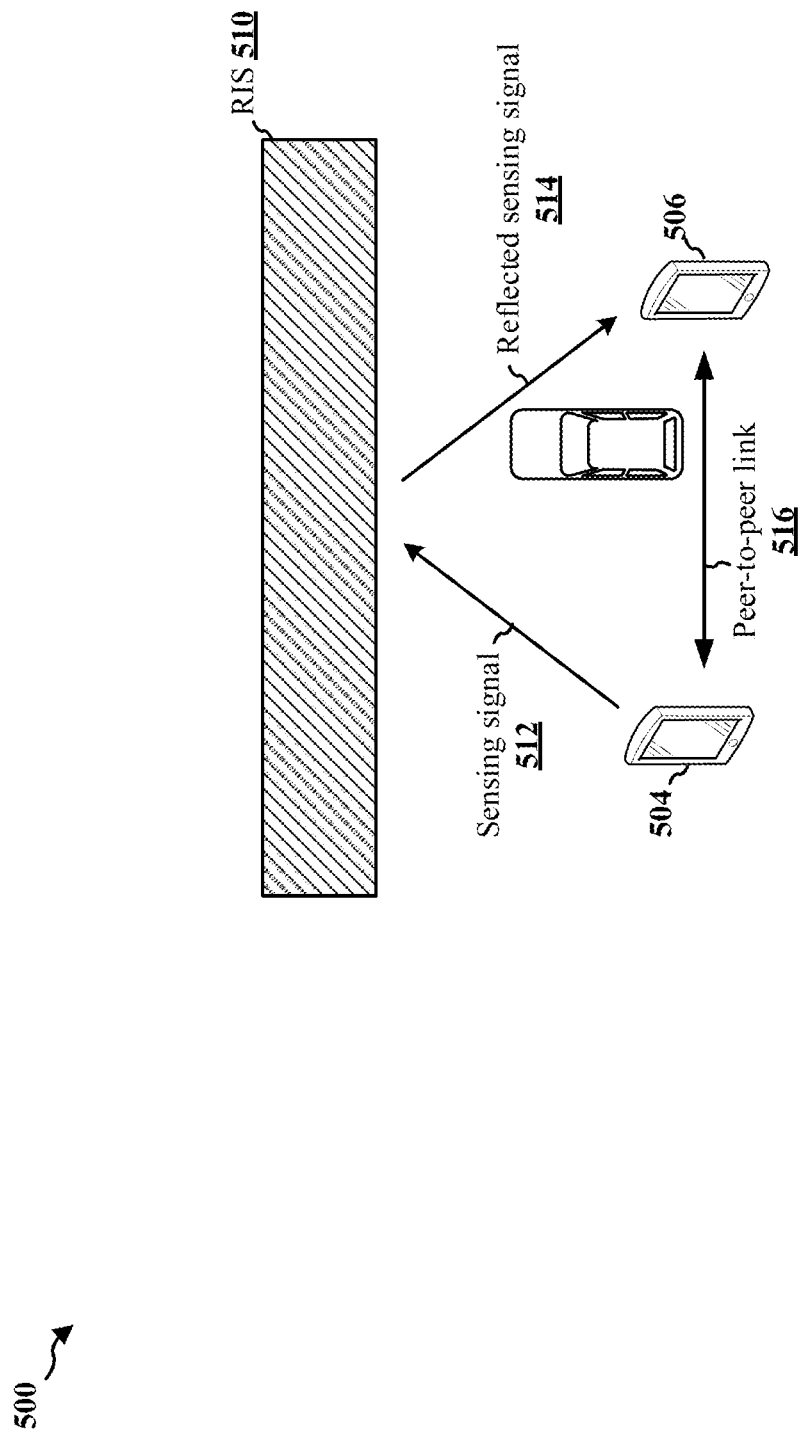
FIG. 5 is a diagram illustrating an example of sensing signal transmission using an RIS by a UE having a communication link established with another UE.

FIG. 5 is a diagram 500 illustrating an example of sensing signal transmission using an RIS 510 by a UE 504 having a communication link 516 established with another UE 506. In some aspects, each of the UEs 504, 506 may be referred to as a wireless node. The UEs 504, 506 may establish the communication link 516 on a sidelink discovery channel, such as a PSDCH, and may communicate on sidelink control and/or data channels, such as a PSCCH and/or PSSCH, respectively.

With the increasing complexity and density of antenna elements configurations, wireless devices may be able to perform some RF sensing. For example, some or all antennas of a wireless node may be operable as radars, able to transmit and receive waveforms with sufficient accuracy and resolution. The antennas may be treated as radar with RF sensing capabilities, and used with appropriate detection algorithms, may combine to function as a consumer-level radar able to send and receive waveforms for bistatic sensing.

In some aspects, bistatic sensing may include the use of RF components of wireless nodes (e.g., the UEs 504, 506, base stations, etc.) being employed as a radar network. For example, with bistatic sensing, the UEs 504, 506 may form a radar network using signals transmitted via at least one antenna of the transmitter UE 504 and received via at least one antenna of the receiver UE 506. In order to sense a target object 530, the UEs 504, 506 may localize themselves relative to one another, and may calculate the channel impulse response (CIR) on each of a set of channels. An object 530 in the environment, located remotely from both UEs 504, 506, may be sensed based on the calculated CIRs and changes thereto over time. Potentially, the object 530 can be sensed with a degree of precision that captures contours or facets of the sensed object, e.g., such that the object 530 can be classified and an associated set of operations may be performed. In some aspects, a sensing UE 504 may derive a position of the object 530 based on sensing the object 530. In some other aspects, the sensing UE 504 may generate an image (e.g., a spectral image) of the object 530 based on sensing the object 530.

This concept of bistatic sensing may be extended to multistatic sensing, which may include multiple transmitters and receivers that are spatially diverse. For example, some multistatic sensing may use multiple spatially diverse bistatic sensing nodes (although multiple spatially diverse monostatic sensing nodes may also be used in different multistatic sensing systems). Multistatic sensing may include data fusion from the spatially diverse nodes. Accordingly, as some multistatic sensing systems are dependent upon bistatic sensing systems, it will be appreciated that the various concepts and aspects described herein may be extended to multistatic sensing.

Such RF sensing may be useful in numerous areas, such as IoT, vehicle-to-everything (V2X), and so forth. For example, RF sensing may provide information related to health monitoring, gesture recognition, contextual information acquisition (e.g., ranging, location tracking, etc.), and automotive radar (e.g., smart cruise control, collision avoidance).

While wireless nodes having full duplex capability may perform monostatic sensing, the full duplex capability may not be available at every wireless node. For some wireless nodes, such as those having half duplex capability, bistatic sensing may be used to sense an environment. Bistatic sensing involves two wireless nodes (and multistatic sensing involves more than two wireless nodes), which may coordinate to exchange some positioning information that may be used for such bistatic sensing.

In some aspects, an RIS 510 may enable peer-to-peer bistatic sensing by providing a path between at two UEs 504, 506. The RIS 510 may be associated with a controller, such as a UE, a base station, a standalone RIS controller, or other wireless node. Requests to configure the reflective elements of the RIS 510 (e.g., requests to adjust one or more reflection coefficients of one or more reflective elements) may be received at the controller of the RIS 510, and the RIS 510 may be configured according to the received request.

In some aspects, a UE 504 that is sensing the environment (e.g., a "sensing node") may also be the controller of the RIS 510. In some other aspects, the UE 504 may discover the RIS 510 and request control thereof, e.g., via a request-response procedure with an RIS control node, which may be centralized. Control of the RIS 510 may be dynamic, with some or all of the elements of the RIS 510 being controllable on a slot-by-slot basis.

The RIS 510 may include a relatively large number of reflective elements, e.g., on a scale of hundreds or thousands. Still, the RIS 510 may be mounted on a wall, such as a building exterior. Using the large number of controllable elements, the RIS 510 may be able to sharpen or increase the spatial resolution of beams incident thereto (e.g., lens-like beam).

As an example, a sensing UE 504 may have an established (peer-to-peer) link 516 with another UE 506 (e.g., an "assistant node" in the context of bistatic sensing by the sensing UE 504). The sensing UE 504 may transmit a burst of sensing signals 512 to the assistant UE 506 using the RIS 510 for bistatic sensing in the environment. The RIS 510 may be configured (e.g., by the sensing UE 504) to reflect the sensing signals 512, resulting in reflected sensing signals 514 being directed toward the assistant UE 506. The assistant UE 506 may receive some or all of the reflected sensing signals 514 and, as further described below, may perform various measurements thereon. The assistant UE 506 may transmit the measurements to the sensing UE 504 over the peer-to-peer link 516, and the sensing UE 504 may use those measurements to sense an object in the environment.

FIG. 6 is a diagram 600 illustrating example scenarios 650, 655 of sensing signal transmission using RISs 610, 660 when line-of-sight (LOS) paths between sensing nodes 604, 652 and assistant nodes 606, 656 are at least partially occluded by blockers 632, 682. In general, an LOS path between sensing and assistant nodes is expected for realization of accurate bistatic sensing. However, such a path may be difficult to obtain, given the number variables in any uncontrolled environment and the frequency with which those variables change.

In one example scenario 650, for example, a sensing node 604 (e.g., a UE) attempting to sense the environment, e.g., to find a target object 630 positioned therein, may be prevented from doing so by a blocker 632 that at least partially occludes the LOS path between the sensing node 604 and the assistant node 606 (e.g., another UE). A blocker 632 may be any fixed or transitory object that obstructs RF waves transmitted by a wireless node, such as RF waves in a mmW (e.g., EHF or near-EHF) frequency range, whether the object is organic or inorganic. Potentially, the blocker 632 may be at a position causing a direct link between the nodes 604, 606 to be blocked, e.g., as mmW communication may often suffer from relatively high path loss. Alone, the sensing and assistant nodes 604, 606 may lack the capabilities or components that allow for communication when an LOS path (and other paths) between the nodes is blocked.

In some other aspects, the sensing node 604 may lack sufficient beamforming capabilities to transmit beams that are narrow enough or have a high enough spatial resolution to accurately sense the target object 630 in an environment, particularly when the object 630 is complicated and/or multi-faceted (e.g., human facial features or expressions). The sensing node 604, however, may overcome this deficiency by leveraging the capabilities of the RIS 610 to focus or narrow beams (e.g., lens-like reflection).

To that end, the sensing node 604 may configure the RIS 610 to modify an incident wave 612 when reflecting the incident wave 612. For example, the sensing node 604 may configure the reflective elements of the RIS 610 to scatter or focus (e.g., lens-like reflection) the reflected wave 614, e.g., into a wavelength range with which contours (e.g., facial features) on the target object 630 may be sensed. Effectively, the RIS 610 may enable detailed and accurate bistatic sensing even though the sensing node lacks the capability to generate a sufficiently narrow beam, as the reflective elements of the RIS 610 may be configured to increase the spatial resolution for the reflected waves 614. To that end, use of the RIS 610 may extend the range at which the target object is able to be sensed, as some focused or narrower reflected beams may improve the signal-to-noise ratio (SNR), increasing the distances at which sensing signals are useful for various calculations related to bistatic sensing (e.g., CIR calculations).

As further described herein, the sensing node 604 and the assistant node 606 may communicate and configure various parameters that may be functional prerequisites to some bistatic sensing calculations. In some instances, this information may be communicated over a sidelink channel. However, the blocker 632 (or another blocker) may interfere with or obstruct signals on the wireless path on which the sidelink channel is configured, thus preventing the sensing node 604 from coordinating with the assistant node 606 and, by extension, preventing the bistatic sensing by the sensing node 604 until the blocker is removed. Such a blocker on a wireless path may be circumvented in some instances through use of the RIS 610 for sidelink data or control information, as well as for sensing signals.

For example, the sensing node 604 may configure the RIS 610 to reflect signals to the assistant node 606. Then, the sensing node 604 may transmit sidelink data or control information coordinating bistatic sensing between the nodes on an incident wave (e.g., the incident wave 612). Such sidelink data or control information may reach the assistant node 606 on a reflected wave 614. Thus, the sensing node 604 may coordinate for bistatic sensing with the assistant node 606 absent an LOS path with the assistant node 606.

In another example scenario 655, for example, a sensing node 652 (e.g., a base station) attempting to sense the environment, e.g., to find a target object 630 positioned therein, may be prevented from doing so by a blocker 682 that at least partially occludes the LOS path between the sensing node 604 and the assistant node 656 (e.g., a UE). For example, the blocker 682 may be positioned in a manner that disrupts sensing signals intended to be communicated between the nodes 652, 656. In the illustrated example, the sensing node 652 may have a clear LOS path to a target object 680 in the environment; however, a blocker 682 may be positioned between the object 680 and the assistant node 656. Consequently, sensing signals transmitted by the sensing node 652 may be obstructed while the LOS path to the assistant node 656 is occluded. Such obstruction may prevent the assistant node 656 from receiving the sensing signals and calculating CIRs or other values that may be used to sense the object 630 in the environment.

However, the sensing signals may be reflected off the target object 680 as the incident wave(s) 662 reach the target object 680. At least some of the incident wave(s) 662 may be reflected toward the RIS 660. The RIS 660 may be configured with reflective elements arranged to direct the reflected wave(s) 676 toward the assistant node 656. Compensating for the RIS 660, such as by accounting for the position of the RIS 660 and the path of the reflected wave(s) 676, the assistant node 656 may still be able to calculate values (e.g., CIRs) indicative of the target object 680 sensed in the environment.

Thus, as shown in the scenarios 650, 655 illustrated in FIG. 6, RISs may improve the ability of wireless nodes to sense objects in an environment using bistatic sensing. Furthermore, RISs may facilitate the coordination of wireless nodes to organizing bistatic sensing, such as by reflecting signals between the wireless nodes used for localization prior to the bistatic sensing.

Figure 7A:
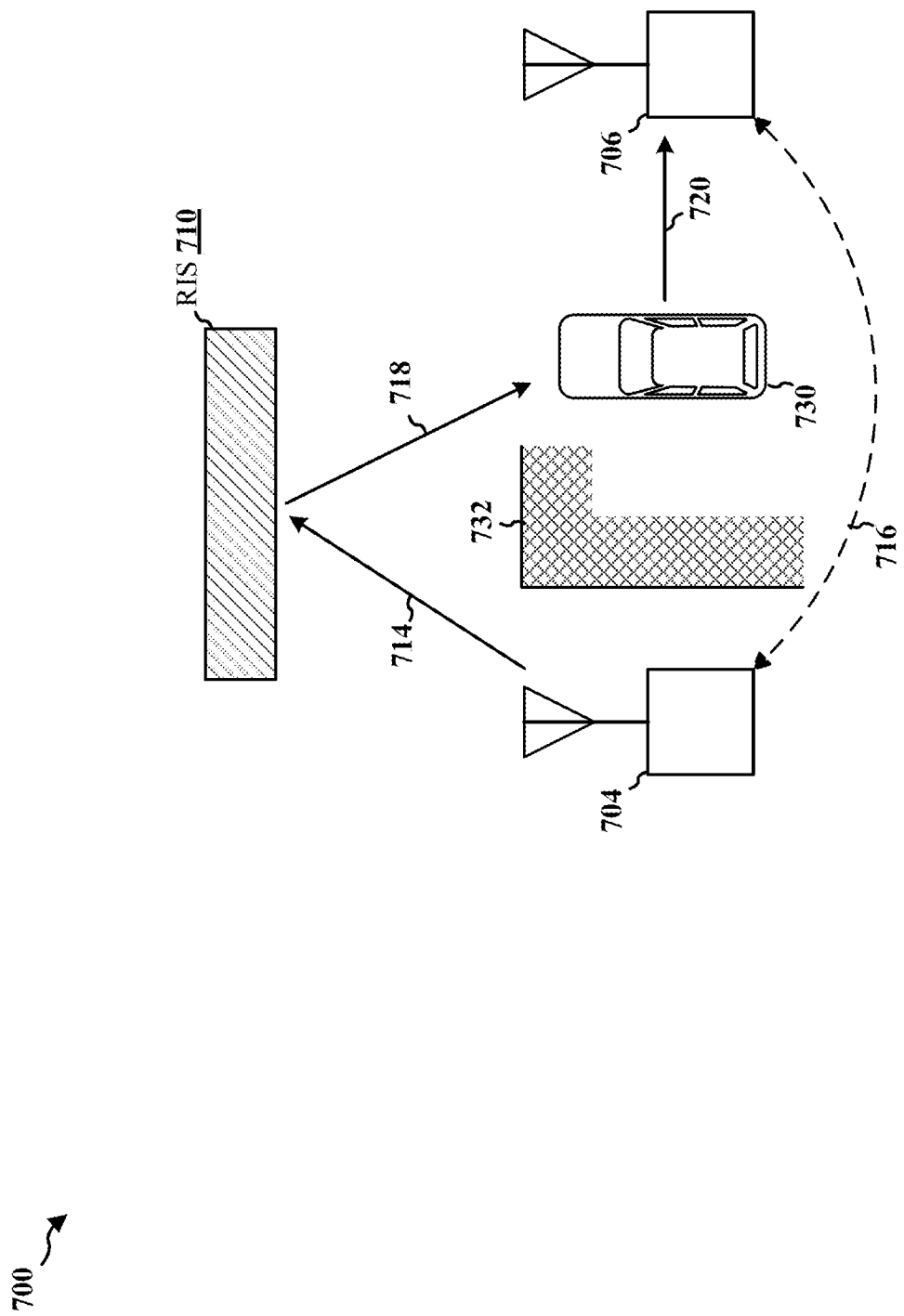
FIGS. 7A and 7B are diagrams illustrating an example of bistatic sensing by wireless nodes using an RIS when an LOS path between a sensing node and an assistant node is at least partially occluded by a blocker.
Figure 7B:
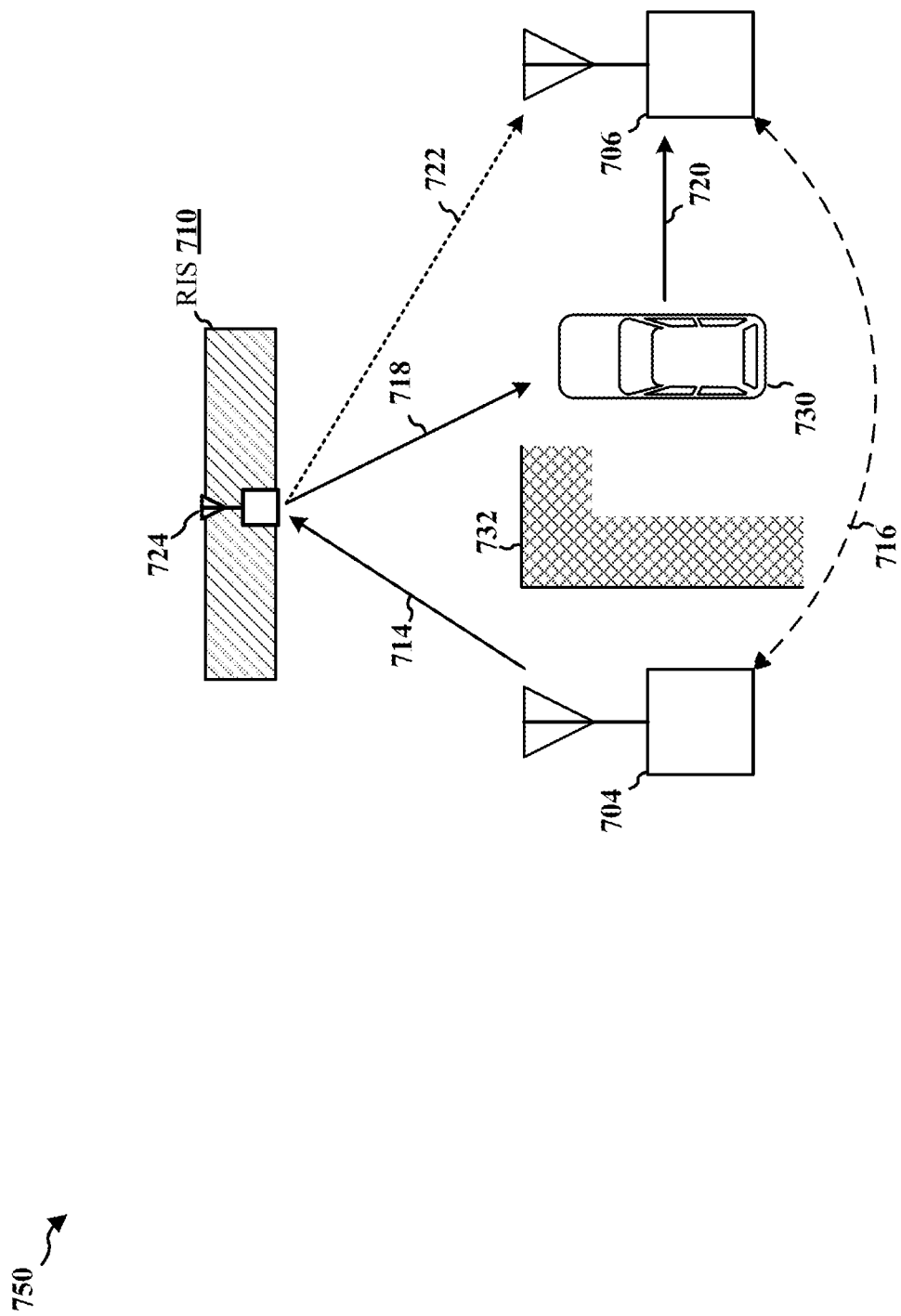

FIGS. 7A and 7B are diagrams 700, 750 illustrating an example of bistatic sensing by wireless nodes 704, 706 using an RIS 710 when an LOS path between the sensing node 704 and an assistant node 706 is at least partially occluded by a blocker 732. According to various aspects, bistatic sensing facilitated by an RIS may involve some coordination prior to sensing an object in the environment. In the illustrated aspects, a sensing node 704 may discover and control the RIS 710. Control of the RIS 710 may be shared with one or more other nodes, e.g., on a slot-by-slot or subframe-by-subframe basis.

In some aspects, the RIS 710 may be controlled by a control node, which may be a centralized control node that may control multiple RISs or a local controller that may be collocated with the RIS 710. For example, the control node may transmit (e.g., broadcast) information indicating or advertising the RIS 710 and the availability thereof. Potentially, the discovery information associated with the RIS 710 may be transmitted on a sidelink channel (e.g., on a PSDCH), and the sensing node 704 may discovery the RIS 710 in a manner that is similar to D2D discovery.

In some aspects, the sensing node 704 may receive a discovery signal associated with the RIS 710, such as a beacon signal or other lightweight signal that announces the presence of the RIS 710 without causing significant overhead on the network. The sensing node 704 may transmit a request or inquiry to the RIS 710, which may indicate the sensing node 704 is requesting to connect with and/or control the RIS 710.

The sensing node 704 may request to use the RIS 710 when the sensing node 704 is aware that that the LOS path with the assistant node 706 is at least partially occluded by the blocker 732. For example, the sensing node 704 may detect an absence of communication or a radio link failure with the assistant node 706, and the sensing node 704 may attempt to reestablish a communication link with the assistant node 706 using the RIS 710 to circumvent the blocker 732. In another example, the sensing node 704 may still be able to communicate with the assistant node 706, but the channel quality may be too poor for accurate bistatic sensing, such as when the SNR fails to satisfy (e.g., is below) a threshold level at which bistatic sensing is regarded as accurate.

Accordingly, the sensing node 704 may transmit a request or inquiry to a controller (e.g., base station or other controller) of the RIS 710 in order to request configuration of the RIS 710 to reflect signals to and/or from the assistant node 706 from and/or to the sensing node 704. The controller of the RIS 710 may respond to the request or inquiry from the sensing node 704 with information associated with the RIS 710. Illustratively, such information may include an operating frequency spectrum of the RIS 710, a location of the RIS 710 (e.g., in a global reference, in a local frame of reference, a 3D position, or a direction in which a pilot signal is transmitted), a control protocol implemented by the RIS 710, a signature of the RIS 710, an area covered or served by the RIS 710, and other such information.

In some other aspects, the sensing node 704 may discover the RIS 710 without the benefit of discovery signals. For example, the sensing node 704 may transmit a request to a base station or other centralized RIS controller requesting to be informed of an RIS that is proximate to the sensing node 704. As the sensing node 704 may benefit from a reflective surface in the same environment the sensing node 704 is to sense with the assistant node 706, the sensing node 704 may include some information about the assistant node 706 in the request, such as a location or position of the assistant node 706, e.g., in addition to information associated with the sensing node 704. Thus, the centralized controller may select the RIS 710 because it is located at a position that is relatively useful to the sensing node 704, as the RIS 710 may provide another path when the LOS path is blocked.

The sensing node 704 may then take control of the RIS 710, e.g., based on information received from the centralized controller (e.g., authentication or validation information). To do so, the sensing node 704 may send a control signal to the RIS 710, which may be in a format of the control protocol indicated by the centralized RIS controller in response to an inquiry. In some aspects, controlling the RIS 710 may be initiated by the control signal—e.g., the control signal from the sensing node 704 may be used to acquire timing synchronization with the sensing node 704 (and potentially, the assistant node 706).

In some other aspects, the sensing node 704 may use the RIS 710 to discover and/or communicate with the assistant node 706. For example, the sensing node 704 may fail to autonomously find a suitably complementary device for bistatic sensing. Instead, the sensing node 704 may use signals reflected off the RIS 710 in order to discover and communicate with various candidate nodes, and then selecting the most suitable candidate node to assist signal transmitted by the sensing node 704. Thus, the RIS 710 may be used to construct and/or maintain the peer-to-peer link 716 between the nodes 704, 706 so that bistatic sensing can be coordinated thereon.

Having established the peer-to-peer link 716, and with an available path identified to the assistant node 706, the sensing node 704 may transmit a sensing request to the assistant node 706. A sensing request may be, for example, a request to act as either a receiver or a transmitter of sensing signals in a bistatic sensing configuration (e.g., an ad hoc bistatic radar network). In some aspects, the sensing request may include information indicating the configuration of sensing signals, a position of the sensing node 704, information related to the RIS 710, and the like.

Potentially, the sensing request may include sufficient information to control the RIS 710, e.g., as the assistant node 706 may control the RIS 710 in some instances. For example, the sensing request transmitted to the assistant node 706 may include information indicating the control protocol and/or signature of the RIS 710. Further, the sensing request may include an RIS control plan if the assistant node 706 is likely to control the RIS 710. For example, the control plan may indicate a one or more sets of reflection coefficients, as well as the time(s) at which to apply each set, e.g., so that the sensing procedure between the nodes 704, 706 is well-coordinated.

The sensing request may be transmitted over the peer-to-peer link 716, although the method of communication and the communication link on which the request is carried may vary in different implementations. In some aspects, the sensing node 704 may transmit the sensing request to the assistant node 706 using the RIS 710, such as in aspects in which the sensing node 704 is a base station (e.g., gNB) and/or centralized RIS controller or in aspects in which the RIS 710 has enabled the peer-to-peer link 716 (e.g., where an LOS path is occluded). Depending upon the implementation of the sensing node 704 and the resources available thereto (and potentially, depending upon the implementation of the assistant node 706), the sensing request may be transmitted on one of uplink or downlink resources or sidelink resources.

In some other aspects, the sensing node 704 may transmit the sensing request to the assistant node 706 through a network (e.g., through at least one base station), e.g., on a fronthaul link or backhaul link. For example, when both the nodes 704, 706 are within a coverage area of a base station, the sensing node 704 may transmit the sensing request to the base station (e.g., on uplink resources, on a fronthaul or backhaul link with the base station), and the base station may then deliver the sensing request to the assistant node 706 on downlink resources.

Based on the sensing request received from the sensing node 704, the assistant node 706 may transmit a response to the sensing node 704. The response may indicate whether the assistant node 706 accepts or declines the sensing request from the sensing node 704. Assuming the former, the response may indicate a position of the assistant node 706, such as via GPS or NR positioning in instances in which the assistant node 706 is configured with a self-positioning capability. Thus, the nodes 704, 706 may localize one another for the bistatic sensing procedure.

As with the sensing request, the response to the sensing request may be transmitted over the peer-to-peer link 716, although the method of communication and the communication link on which the response is carried may vary in different implementations. In some aspects, the assistant node 706 may transmit the response to the sensing node 704 using the RIS 710, such as in aspects in which the RIS 710 has enabled the peer-to-peer link 716 (e.g., where an LOS path is occluded). Depending upon the implementation of the assistant node 706 and the resources available thereto (and potentially, depending upon the implementation of the sensing node 704), the response may be transmitted on one of uplink or downlink resources or sidelink resources.

In some other aspects, the assistant node 706 may transmit the response to the sensing node 704 through a network (e.g., through at least one base station), e.g., on a fronthaul link or backhaul link. For example, when both the nodes 704, 706 are within a coverage area of a base station, the assistant node 706 may transmit the response to the base station (e.g., on uplink resources, on a fronthaul or backhaul link with the base station), and the base station may then deliver the sensing request to the sensing node 704 on downlink resources.

Once a communication link is established between the nodes 704, 706, and the assistant node 706 has accepted the sensing response to contribute to bistatic sensing, some RIS-related measurements may be performed. Such RIS-related measurements may compensate or account for the non-LOS, and potentially circuitous, path that sensing signals may traverse to reach one or the other of the nodes 704, 706.

In some aspects, the sensing node 704 may transmit one or more RS(s) to the assistant node 706 along a path that traverses the RIS 710. The one or more RS(s) may include synchronization signals, reference signals, and/or other pilot signals. For example, the one or more RS(s) may include one or more of a PSS, SSS, CSI-RS, etc.

The assistant node 706 may receive one or more of the RS(s), reflected off the RIS 710 (but not the object 730), and based thereon, may measure a least one value of a time or arrival (ToA), an angle of arrival (AoA), a CIR, and/or another value(s). The value(s) measured by the assistant node 706 from signals not reflected off the object 730 may then be used for filtering (e.g., filtering out direct reflection from the RIS 710 during sensing). Potentially, the assistant node 706 may establish a reference time for bistatic sensing using the ToA or other measured timing value.

In some other aspects, the assistant node 706 may transmit one or more RS(s) toward the RIS 710 at an established time (e.g., a preconfigured time or a time indicated during the sensing request-response exchange), such as a timing offset relative to the sensing request. The RS(s) transmitted by the assistant node 706 may be reflected to the sensing node 704, which may use at least one of the RS(s) to measure a round trip time (RTT), and filter out direct reflection from the RIS 710.

Subsequently, the sensing node 704 and the assistant node 706 may proceed to bistatic sensing in the environment using the RIS 710, and may do so even where an object 730 is behind a blocker 732 that occludes the LOS path between the nodes 704, 706. In one configuration, the sensing node 704 may transmit a burst of sensing signals 714 (e.g., sensing RSs) toward the RIS 710, which may be on incident waveforms contacting the RIS 710. The sensing signals 714 may be reflected at incident angle(s) from the RIS 710 and toward the object 730. The reflected sensing signals 718 may therefore strike the object 730 and may be scattered thereby. A portion of the RIS-reflected sensing signals 718 may be reflected off the object 730 and toward the assistant node 706, which may receive the object-reflected sensing signals 720.

In another configuration, either the sensing node 704 or the assistant node 706 may control the RIS 710 to change a set of states or patterns to effectively provide a beam sweep when the sensing signals 714 are reflected off the RIS 710. For example, reflection coefficients may be varied over a set of time intervals according to a pattern, which may be repeated, so that the reflective elements direct the reflected sensing signals 718 in multiple different directions. The reflection coefficients may be adjusted according to the pattern at a symbol-level interval, slot-level interval, subframe-level interval, or another interval. This reconfiguration, which may function as beam sweeping the reflected signals 718, may cause the reflected sensing signals 718 to be reflected off different regions of the object 730 at different angles of incidence. Therefore, the assistant node 706 may receive reflected sensing signals 720 reflected from the object 730 with ToAs, AoAs, etc. and representing different CIRs, which may be used to derive regions (e.g., including contours and facets) of the object 730 that are different or additional to those regions sensed with a statically configured RIS 710.

In some aspects, the sensing node 704 may calculate the pattern to be applied for reflecting sensing signals 714 by the RIS 710. For example, the sensing node 704 may calculate a set of reflection coefficients to be applied to reflective elements of the RIS 710 at each of a set of time intervals— e.g., a first set of reflection coefficients to be applied at a first slot or subframe, a second set of reflection coefficients to be applied at a second slot or subframe, and so forth.

In aspects in which the sensing node 704 does not control the RIS 710, the sensing node 704 may transmit information indicating the pattern to an RIS controller, e.g., as a request to apply the pattern according to a schedule provided by the sensing node 704.

In some other aspects, the sensing node 704 may transmit one or more RIS control signals, e.g., according to an RIS control protocol, and the RIS control signals may instruct the RIS 710 to apply a pattern of reflection coefficients or other adjustments at a particular time, such as the time at which the RIS control signals are received (and processed) for the RIS 710. Such RIS control signals may be embedded with the sensing signals 714 (e.g., in-band, potentially time-domain multiplexed with the sensing signals 714) and/or separately transmitted from the sensing signals 714 (e.g., out-of-band, adjacent band, and/or potentially frequency-domain multiplexed with the sensing signals 714).

Referring to FIG. 7B, the assistant node 706 detects reflected sensing signals 718 having angles of incidence at the object 730. When receiving such reflected sensing signals 718, the assistant node 706 may record respective ToAs, AoAs, and/or other information. In some aspects, the assistant node 706 may calculate at least one respective time difference of arrival (TDoA) based on at least one of the reflected sensing signals 718 having an angle of incidence with the object 730. For example, the assistant node 706 may calculate a respective TDoA as the difference between a reference time (or ToA) recorded from a signal transmitted by the sensing node 704 and reflected at the RIS 710 but not reflected at the object 730 and a ToA recorded from at least one of the reflected sensing signals 720 having angles of incidence with both the RIS 710 and the object 730.

The assistant node 706 may filter out some other reflected sensing signals 722 having no angles of incidence at the object 730. In some aspects, the assistant node 706 may detect those sensing signals 722 to filter out based on the ToAs recorded for the reflected sensing signals 722. For example, the assistant node 706 may compare respective ToAs of the reflected sensing signals 722 with at least one reference time, such as another ToA earlier recorded from one or more earlier received signals reflected off the RIS 710 and not the object 730. The filtered out sensing signals 722 may be indicative of space in the environment in which the object 730 is not positioned.

In some aspects, the assistant node 706 may be operable to perform bistatic sensing operations. For example, the assistant node 706 may treat the RIS 710 as virtual node 724, in that the assistant node 706 may determine the position (and/or other information, such as contour and facet information of the object 730) as though the virtual node 724 were the transmitter in the bistatic sensing arrangement and the reflected sensing signals 720 had originated therefrom. In some aspects, the assistant node 706 may acquire the distance between the assistant node 706 and the RIS 710, and the assistant node 706 may derive the position of the object based on the reflected sensing signals 720 and the distance between the assistant node 706 and the RIS 710. The assistant node 706 may then report the position of the object 730 to the sensing node 704. Potentially, the assistant node 706 may compensate for the path components for the initial transmission of the sensing signals 714 (prior to angles of incidence at the RIS 710), as the path components (e.g., path duration) between the sensing node 704 and the RIS 710 may be the same, regardless of whether one or more of the sensing signals 714 is subsequently reflected off the object 730.

In some other aspects, the sensing node 704 may perform the bistatic sensing operations to derive the position of the object 730, e.g., rather than the assistant node 706. In such other aspects, the assistant node 706 may report measurement(s) calculated from the reflected sensing signals 720 to the sensing node 704, e.g., including the at least one TDoA, and potentially including one or more AoAs and/or CIRs. For example, the assistant node 706 may transmit information reporting such measurements over the peer-to-peer link 716 and/or using the RIS 710 as a path to the sensing node 704. The sensing node 704, having already obtained the distance to the assistant node 706 (as well as the distance to the RIS 710), may then use bistatic sensing operations to derive the position of the target object 730 based on the measurement(s) received from the assistant node 706, even while the LOS path with both the object 730 and the assistant node 706 is occluded by the blocker 732.

Figure 8:
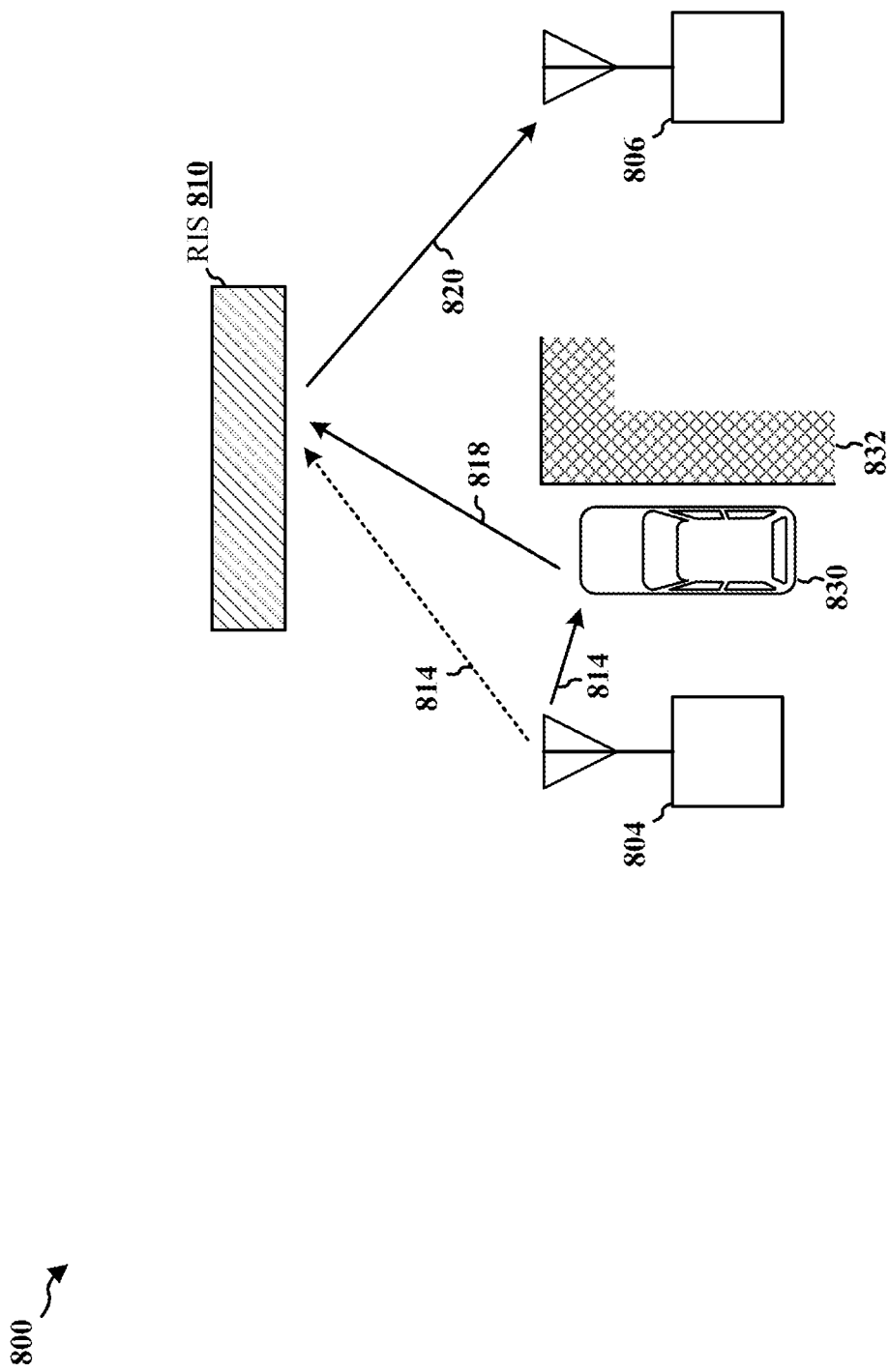
FIG. 8 is a diagram illustrating another example of bistatic sensing by wireless nodes using an RIS when an LOS path between a sensing node and an assistant node is at least partially occluded by a blocker.

FIG. 8 is a diagram 800 illustrating some other examples of bistatic sensing by wireless nodes 804, 806 using an RIS 810 when an LOS path between the sensing node 804 and an assistant node 806 is at least partially occluded. As illustrated, the LOS path between the sensing node 804 and the assistant node 806 is occluded by a blocker 832; however, the LOS path between the sensing node and a target object 830 may be sufficiently free from blockers.

In some aspects, the sensing node 804 may transmit a burst of sensing signals 814 toward the target object 830. At least one of the sensing node 804 or the assistant node 806 may control the RIS 810 to adjust the reconfigurable surface, such as by configuring the RIS 810 with a set of reflection coefficients to be applied to a set of reflective elements forming the reconfigurable surface. In particular, at least one of the nodes 804, 806 may configure the RIS 810 to reflect various sensing signals in various directions, as in a beam sweeping pattern. For example, reflection coefficients may be varied over a set of time intervals according to a pattern, which may be repeated, so that the reflective elements direct the reflected sensing signals 818 from multiple different directions. The reflection coefficients may be adjusted according to the pattern at a symbol-level interval, slot-level interval, subframe-level interval, or another interval.

This reconfiguration, which may function as beam sweeping the sensing signals 814 and the reflected sensing signals 818, may direct the reflected sensing signals 818 that are reflected off of different regions of the object 830 at different angles of incidence toward the assistant node 806. Therefore, the assistant node 806 may receive reflected sensing signals 820 reflected off the RIS 810 at angles of incidence at the object 830. Thus, the assistant node 806 may determine various measurements and/or calculations (e.g., ToAs, AoAs, CIRs, etc.) from sensing signals traveling along paths that reflect off various regions (e.g., including contours and facets) of the object 830.

In some aspects, at least one of the nodes 804, 806 may calculate the pattern to be applied for reflecting sensing signals 814, 818 by the RIS 810. For example, the sensing node 804 may calculate a set of reflection coefficients to be applied to reflective elements of the RIS 810 at each of a set of time intervals—e.g., a first set of reflection coefficients to be applied at a first slot or subframe, a second set of reflection coefficients to be applied at a second slot or subframe, and so forth.

In aspects in which the neither of the nodes 804, 806 controls the RIS 810, information indicating the pattern may be transmitted to an RIS controller, e.g., as a request to apply the pattern according to a schedule.

In some other aspects, the sensing node 804 (or assistant node 806) may transmit one or more RIS control signals, e.g., according to an RIS control protocol, and the RIS control signals may instruct the RIS 810 to apply a pattern of reflection coefficients or other adjustments at a particular time, such as the time at which the RIS control signals are received (and processed) for the RIS 810. Such RIS control signals may be embedded with the sensing signals 814 (e.g., in-band, potentially time-domain multiplexed with the sensing signals 814) and/or separately transmitted from the sensing signals 814 (e.g., out-of-band, adjacent band, and/or potentially frequency-domain multiplexed with the sensing signals 814).

Accordingly, the assistant node 806 detects reflected sensing signals 818 having angles of incidence at the object 830. When receiving such reflected sensing signals 818, the assistant node 806 may record respective ToAs, AoAs, and/or other information. In some aspects, the assistant node 806 may calculate at least one respective time difference of arrival (TDoA) based on at least one of the reflected sensing signals 818 having an angle of incidence with the object 830. For example, the assistant node 806 may calculate a respective TDoA as the difference between a reference time (or ToA) recorded from a signal transmitted by the sensing node 804 and reflected at the RIS 810 but not reflected at the object 830 and a ToA recorded from at least one of the reflected sensing signals 820 having angles of incidence with both the RIS 810 and the object 830.

The assistant node 806 may filter out some other reflected sensing signals 822 having no angles of incidence at the object 830. In some aspects, the assistant node 806 may detect those sensing signals 822 to filter out based on the ToAs recorded for the reflected sensing signals 822. For example, the assistant node 806 may compare respective ToAs of the reflected sensing signals 822 with at least one reference time, such as another ToA earlier recorded from one or more earlier received signals reflected off the RIS 810 and not the object 830. The filtered out sensing signals 822 may be indicative of space in the environment in which the object 830 is not positioned.

In some aspects, the assistant node 806 may be operable to perform bistatic sensing operations to derive the position of the target object 830, e.g., despite the object 830 being positioned with the blocker 832 occluding the LOS path to the assistant node 806. For example, the assistant node 806 may treat the RIS 810 as virtual node, in that the assistant node 806 may determine the position (and/or other information, such as contour and facet information of the object 830) as though the virtual node were the transmitter in the bistatic sensing arrangement and the reflected sensing signals 820 had originated therefrom. In some aspects, the assistant node 806 may acquire the distance between the assistant node and the RIS 810, and the assistant node 806 may derive the position of the object based on the reflected sensing signals 820 and the distance between the assistant node and the RIS 810. The assistant node 806 may then report the position of the object 830 to the sensing node 804. Potentially, the assistant node 806 may compensate for the path components for the initial transmission of the sensing signals 814 (prior to angles of incidence at the RIS 810), as the path components (e.g., path duration) between the sensing node 804 and the RIS 810 may be the same, regardless of whether one or more of the sensing signals 814 is subsequently reflected off the object 830.

Figure 9:
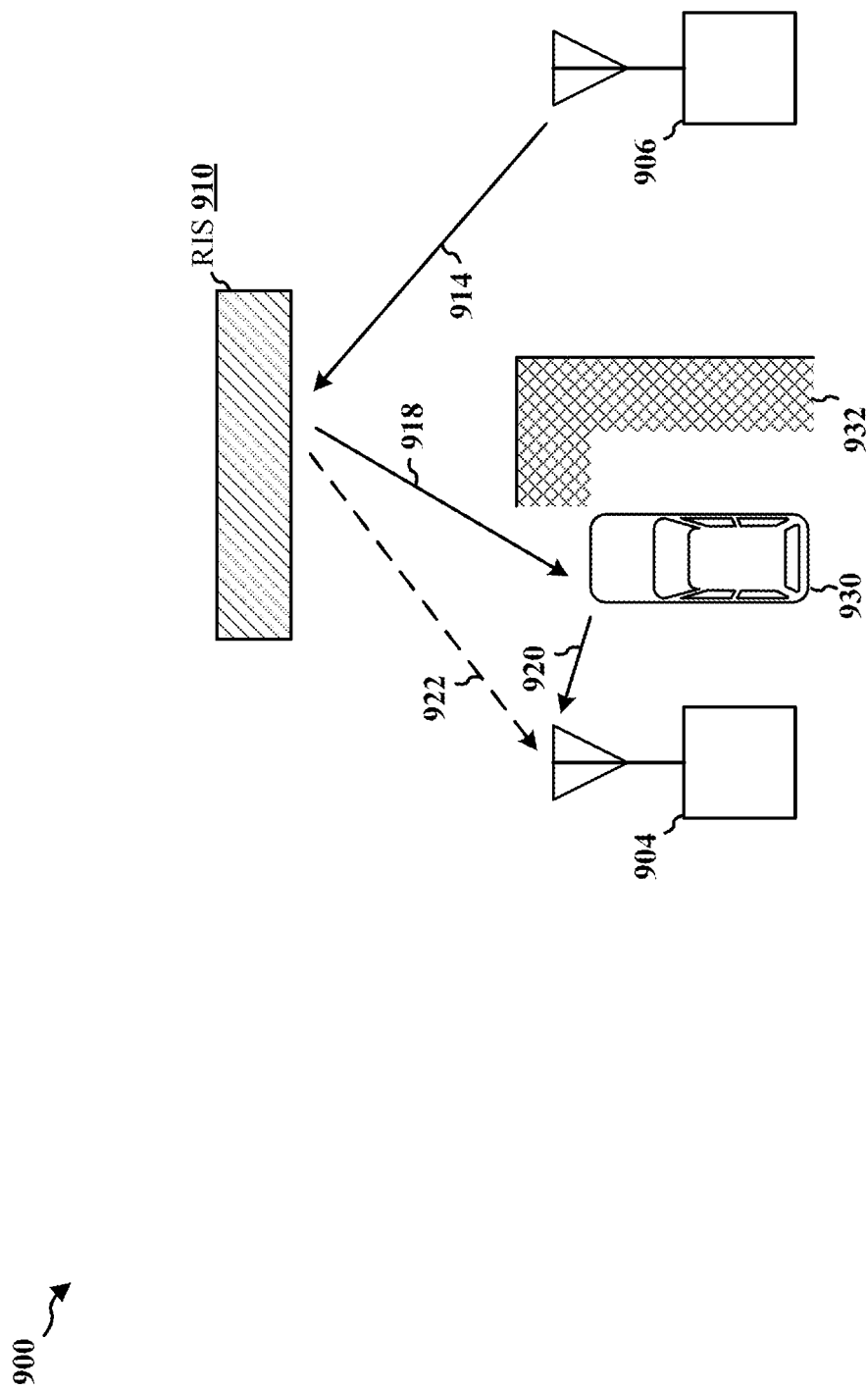
FIG. 9 is a diagram illustrating a further example of bistatic sensing by wireless nodes using an RIS when an LOS path between a sensing node and an assistant node is at least partially occluded by a blocker.

FIG. 9 is a diagram 900 illustrating an example of bistatic sensing using an MS 910 when an LOS path between wireless nodes 904, 906 is at least partially occluded. In one configuration, the assistant node 906 may transmit a burst of sensing signals 914 (e.g., sensing RSs) toward the RIS 910, which may be on incident waveforms contacting the RIS 910. The sensing signals 914 may be reflected at incident angle(s) from the RIS 910 and toward the object 930, e.g., positioned on the opposite side of the blocker 932 relative to the assistant node 906. The reflected sensing signals 918 may therefore strike the object 930 and may be scattered thereby. A portion of the MS-reflected sensing signals 918 may be reflected off the object 930 and toward the sensing node 904, which may receive the object-reflected sensing signals 920.

In another configuration, either the sensing node 904 or the assistant node 906 may control the RIS 910 to change a set of states or patterns to effectively provide a beam sweep when the sensing signals 914 are reflected off the RIS 910. That is, at least one of the nodes 904, 906 may control the RIS 910 to change the states and/or pattern (e.g., beam sweeping pattern) to achieve better sensing performance (e.g., reflecting signals toward desirable angles of incidence at the target object 930) and/or obtain a full spatial image of target object 930. For example, reflection coefficients may be varied over a set of time intervals according to a pattern, which may be repeated, so that the reflective elements direct the reflected sensing signals 918 in multiple different directions. The reflection coefficients may be adjusted according to the pattern at a symbol-level interval, slot-level interval, subframe-level interval, or another interval. This reconfiguration, which may function as beam sweeping the reflected signals 918, may cause the reflected sensing signals 918 to be reflected off different regions of the object 930 at different angles of incidence. Therefore, the assistant node 906 may receive reflected sensing signals 920 reflected from the object 930 with ToAs, AoAs, etc. and representing different CIRs, which may be used to derive regions (e.g., including contours and facets) of the object 930 that are different or additional to those regions sensed with a statically configured RIS 910.

In some aspects, the assistant node 906 may calculate the pattern to be applied for reflecting sensing signals 914 by the RIS 910. For example, the assistant node 906 may calculate a set of reflection coefficients to be applied to reflective elements of the RIS 910 at each of a set of time intervals—e.g., a first set of reflection coefficients to be applied at a first slot or subframe, a second set of reflection coefficients to be applied at a second slot or subframe, and so forth.

In aspects in which the assistant node 906 does not control the RIS 910, the assistant node 906 may transmit information indicating the pattern to an RIS controller, e.g., as a request to apply the pattern according to a schedule provided by the assistant node 906.

In some other aspects, the assistant node 906 may transmit one or more RIS control signals, e.g., according to an RIS control protocol, and the RIS control signals may instruct the RIS 910 to apply a pattern of reflection coefficients or other adjustments at a particular time, such as the time at which the RIS control signals are received (and processed) for the RIS 910. Such RIS control signals may be embedded with the sensing signals 914 (e.g., in-band, potentially time-domain multiplexed with the sensing signals 914) and/or separately transmitted from the sensing signals 914 (e.g., out-of-band, adjacent band, and/or potentially frequency-domain multiplexed with the sensing signals 914).

In the illustrated example, the sensing node 904 detects reflected sensing signals 918 having angles of incidence at the object 930. When receiving such reflected sensing signals 918, the sensing node 904 may record respective ToAs, AoAs, and/or other information. In some aspects, the sensing node 904 may calculate at least one respective TDoA based on at least one of the reflected sensing signals 918 having an angle of incidence with the object 930. For example, the sensing node 904 may calculate a respective TDoA as the difference between a reference time (or ToA) recorded from a signal transmitted by the assistant node 906 and reflected at the RIS 910 but not reflected at the object 930 and a ToA recorded from at least one of the reflected sensing signals 920 having angles of incidence with both the RIS 910 and the object 930.

The sensing node 904 may filter out some other reflected sensing signals 922 having no angles of incidence at the object 930. In some aspects, the sensing node 904 may detect those sensing signals 922 to filter out based on the ToAs recorded for the reflected sensing signals 922. For example, the sensing node 904 may compare respective ToAs of the reflected sensing signals 922 with at least one reference time, such as another ToA earlier recorded from one or more earlier received signals reflected off the RIS 910 and not the object 930. The filtered out sensing signals 922 may be indicative of space in the environment in which the object 930 is not positioned.

In some aspects, the sensing node 904 may be operable to perform bistatic sensing operations. For example, the sensing node 904 may treat the RIS 910 as virtual node, in that the sensing node 904 may determine the position (and/or other information, such as contour and facet information of the object 930) as though the virtual node were the transmitter in the bistatic sensing arrangement and the reflected sensing signals 920 had originated therefrom. In some aspects, the sensing node 904 may acquire the distance between the sensing node 904 and the RIS 910, and the sensing node 904 may derive the position of the object based on the reflected sensing signals 920 and the distance between the sensing node 904 and the RIS 910. In some aspects, the sensing node 904 may report the position of the object 930 to the assistant node 906, even where the sensing node 904 initiated or requested the bistatic sensing procedure. Potentially, the sensing node 904 may compensate for the path components for the initial transmission of the sensing signals 914 (prior to angles of incidence at the RIS 910), as the path components (e.g., path duration) between the assistant node 906 and the RIS 910 may be the same, regardless of whether one or more of the sensing signals 914 is subsequently reflected off the object 930.

Figure 10:
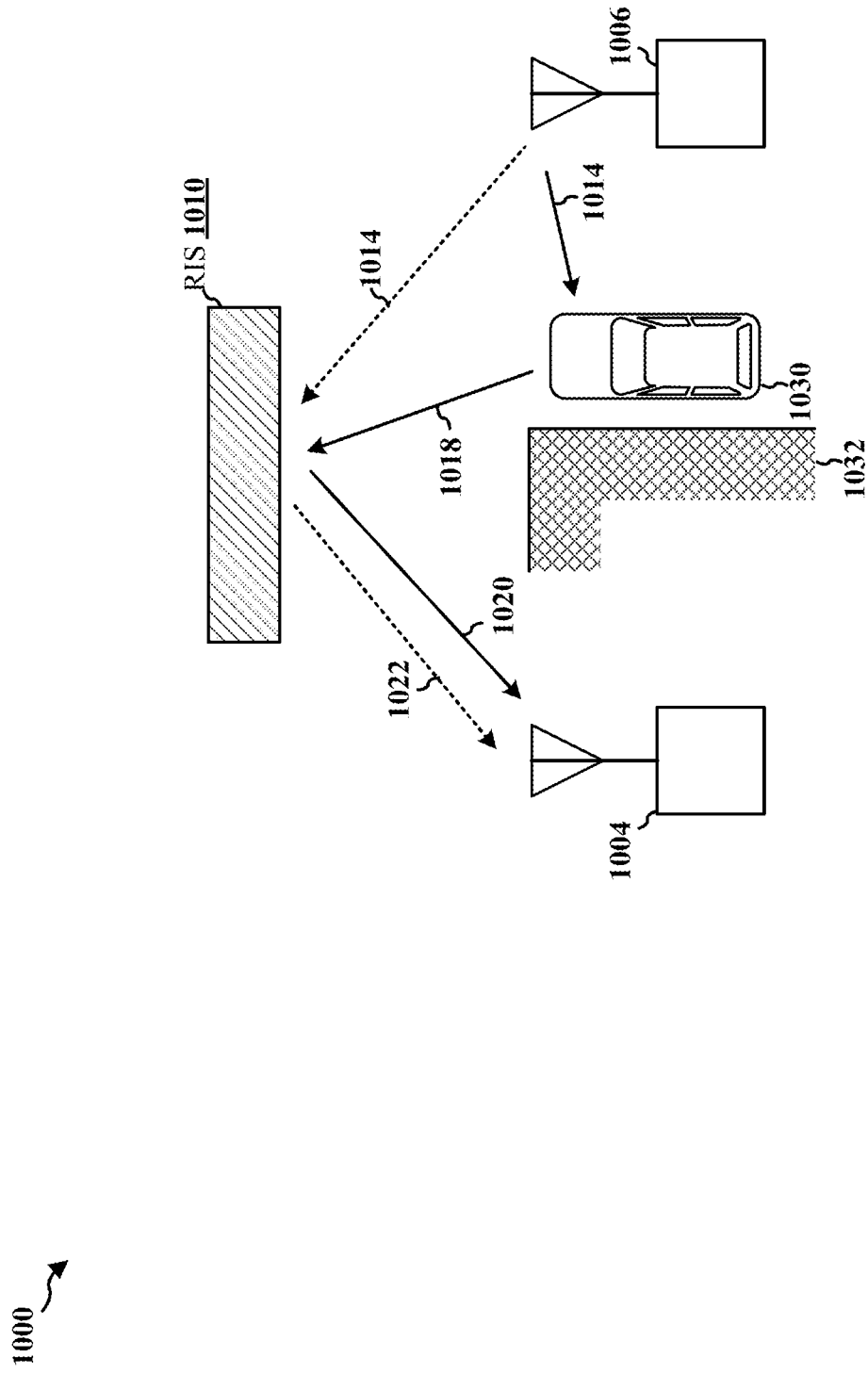
FIG. 10 is a diagram illustrating still another example of bistatic sensing by wireless nodes using an RIS when an LOS path between a sensing node and an assistant node is at least partially occluded by a blocker.

FIG. 10 is a diagram 1000 illustrating still another example of bistatic sensing using an RIS 1010 when an LOS path between wireless nodes 1004, 1006 is at least partially occluded. As illustrated, the LOS path between the assistant node 1006 and the sensing node 1004 is occluded by a blocker 1032; however, the LOS path between the assistant node and a target object 1030 may be sufficiently free from blockers.

In some aspects, the assistant node 1006 may transmit a burst of sensing signals 1014 toward the target object 1030. At least one of the assistant node 1006 or the sensing node 1004 may control the RIS 1010 to adjust the reconfigurable surface, such as by configuring the RIS 1010 with a set of reflection coefficients to be applied to a set of reflective elements forming the reconfigurable surface. In particular, at least one of the nodes 1004, 1006 may configure the RIS 1010 to reflect various sensing signals in various directions, as in a beam sweeping pattern. For example, reflection coefficients may be varied over a set of time intervals according to a pattern, which may be repeated, so that the reflective elements direct the reflected sensing signals 1018 from multiple different directions. The reflection coefficients may be adjusted according to the pattern at a symbol-level interval, slot-level interval, subframe-level interval, or another interval.

This reconfiguration, which may function as beam sweeping the sensing signals 1014 and the reflected sensing signals 1018, may direct the reflected sensing signals 1018 that are reflected off of different regions of the object 1030 at different angles of incidence toward the sensing node 1004. Therefore, the sensing node 1004 may receive reflected sensing signals 1020 reflected off the RIS 1010 at angles of incidence at the object 1030. Thus, the sensing node 1004 may determine various measurements and/or calculations (e.g., ToAs, AoAs, CIRs, etc.) from sensing signals traveling along paths that reflect off various regions (e.g., including contours and facets) of the object 1030.

In some aspects, at least one of the nodes 1004, 1006 may calculate the pattern to be applied for reflecting sensing signals 1014, 1018 by the RIS 1010. For example, the assistant node 1006 may calculate a set of reflection coefficients to be applied to reflective elements of the RIS 1010 at each of a set of time intervals—e.g., a first set of reflection coefficients to be applied at a first slot or subframe, a second set of reflection coefficients to be applied at a second slot or subframe, and so forth. Such a pattern may be calculated to configure the RIS 1010 to change states and/or patterns (e.g., as with beam sweeping) to achieve better sensing performance and/or obtain a full or more complete spatial image of potential target object.

In aspects in which the neither of the nodes 1004, 1006 controls the RIS 1010, information indicating the pattern may be transmitted to an RIS controller, e.g., as a request to apply the pattern according to a schedule.

In some other aspects, the assistant node 1006 (or sensing node 1004) may transmit one or more RIS control signals, e.g., according to an RIS control protocol, and the RIS control signals may instruct the RIS 1010 to apply a pattern of reflection coefficients or other adjustments at a particular time, such as the time at which the RIS control signals are received (and processed) for the RIS 1010. Such RIS control signals may be embedded with the sensing signals 1014 (e.g., in-band, potentially time-domain multiplexed with the sensing signals 1014) and/or separately transmitted from the sensing signals 1014 (e.g., out-of-band, adjacent band, and/or potentially frequency-domain multiplexed with the sensing signals 1014).

Accordingly, the sensing node 1004 detects reflected sensing signals 1018 having angles of incidence at the object 1030. When receiving such reflected sensing signals 1018, the sensing node 1004 may record respective ToAs, AoAs, and/or other information. In some aspects, the sensing node 1004 may calculate at least one respective TDoA based on at least one of the reflected sensing signals 1018 having an angle of incidence with the object 1030. For example, the sensing node 1004 may calculate a respective TDoA as the difference between a reference time (or ToA) recorded from a signal transmitted by the assistant node 1006 and reflected at the RIS 1010 but not reflected at the object 1030 and a ToA recorded from at least one of the reflected sensing signals 1020 having angles of incidence with both the RIS 1010 and the object 1030.

The sensing node 1004 may filter out some other reflected sensing signals 1022 having no angles of incidence at the object 1030. In some aspects, the sensing node 1004 may detect those sensing signals 1022 to filter out based on the ToAs recorded for the reflected sensing signals 1022. For example, the sensing node 1004 may compare respective ToAs of the reflected sensing signals 1022 with at least one reference time, such as another ToA earlier recorded from one or more earlier received signals reflected off the RIS 1010 and not the object 1030. The filtered out sensing signals 1022 may be indicative of space in the environment in which the object 1030 is not positioned.

In some aspects, the sensing node 1004 may be operable to perform bistatic sensing operations to derive the position of the target object 1030, e.g., despite the object 1030 being positioned with the blocker 1032 occluding the LOS path to the sensing node 1004. For example, the sensing node 1004 may treat the RIS 1010 as virtual node, in that the sensing node 1004 may determine the position (and/or other information, such as contour and facet information of the object 1030) as though the virtual node were the transmitter in the bistatic sensing arrangement and the reflected sensing signals 1020 had originated therefrom. In some aspects, the sensing node 1004 may acquire the distance between the sensing node and the RIS 1010, and the sensing node 1004 may derive the position of the object based on the reflected sensing signals 1020 and the distance between the sensing node and the RIS 1010. In some aspects, the sensing node 1004 may then report the position of the object 1030 to the assistant node 1006. Potentially, the sensing node 1004 may compensate for the path components for the initial transmission of the sensing signals 1014 (prior to angles of incidence at the RIS 1010), as the path components (e.g., path duration) between the assistant node 1006 and the RIS 1010 may be the same, regardless of whether one or more of the sensing signals 1014 is subsequently reflected off the object 1030.

Figure 11:
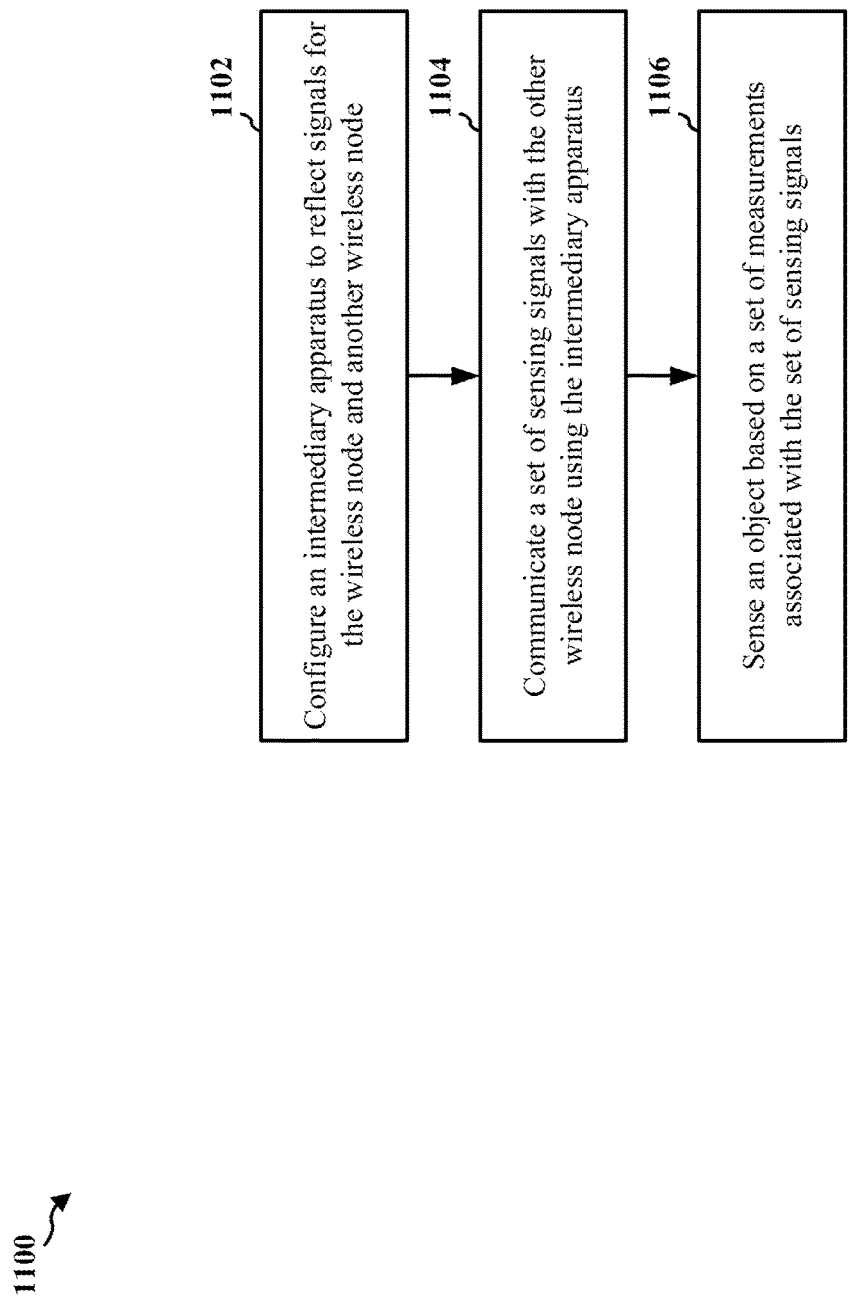
FIG. 11 is a flowchart of a method of bistatic sensing at a wireless node.

FIG. 11 is a flowchart 1100 of a method of bistatic sensing at a wireless node. The method may be performed by a UE (e.g., a UE 104, 350, 404, 406, 504, 506), a base station (e.g., the base station 102/180, 310, 402), a wireless node (e.g., one of the nodes 604, 606, 652, 656, 704, 706, 804, 806, 904, 906, 1004, 1006), an apparatus (e.g., the apparatus 1302), or at least one component of any of the foregoing. According to different aspects, one or more of the illustrated operations may be transposed, omitted, and/or contemporaneously performed.

At 1102, the wireless node may configure an intermediary apparatus to reflect signals for the wireless node and another wireless node. For example, first, the wireless node may calculate a set of reflection coefficients, and second, the wireless node may transmit the set of reflection coefficients to the intermediary apparatus to adjust reflective characteristics thereof. For example, referring to FIGS. 7A, 7B, and 8-10, at least one of the wireless nodes 704, 804, 904, 1004 may configure a respective one of the RIS 710, 810, 910, 1010 to reflect signals for the other wireless node 706, 806, 906, 1006.

At 1104, the wireless node may communicate a set of sensing signals with the other wireless node using the intermediary apparatus. For example, the wireless node may transmit signals in at least one direction for reflection off the intermediary apparatus to be detected by the other wireless node, or the wireless node may receive signals reflected in at least one direction off the intermediary apparatus following transmission by the other wireless node. For example, referring to FIGS. 7A, 7B, and 8-10, at least one of the wireless nodes 704, 804, 904, 1004 may transmit signals 714, 814, 914, 1014 in at least one direction for reflection off the RIS 710, 810, 910, 1010 to be detected by the other wireless node 706, 806, 906, 1006, or the wireless node 704, 804, 904, 1004 may receive signals 720, 820, 920, 1020 reflected in at least one direction off the RIS 710, 810, 910, 1010 following transmission by the other wireless node 706, 806, 906, 1006.

At 1106, the wireless node may sense an object based on a set of measurements associated with the set of sensing signals. For example, the wireless node may calculate a TDoA between a reference time and a ToA of at least one signal reflected off the object. The wireless node may then perform bistatic sensing based on the TDoA to obtain at least one of a position of the object and/or an image representing the object. For example, referring to FIGS. 7A, 7B, and 8-10, at least one of the wireless nodes 704, 706, 804, 806, 904, 906, 1004, 1006 may sense an object 730, 830, 930, 1030 based on a set of measurements associated with the set of sensing signals 720, 820, 920, 1020.

Figure 12:
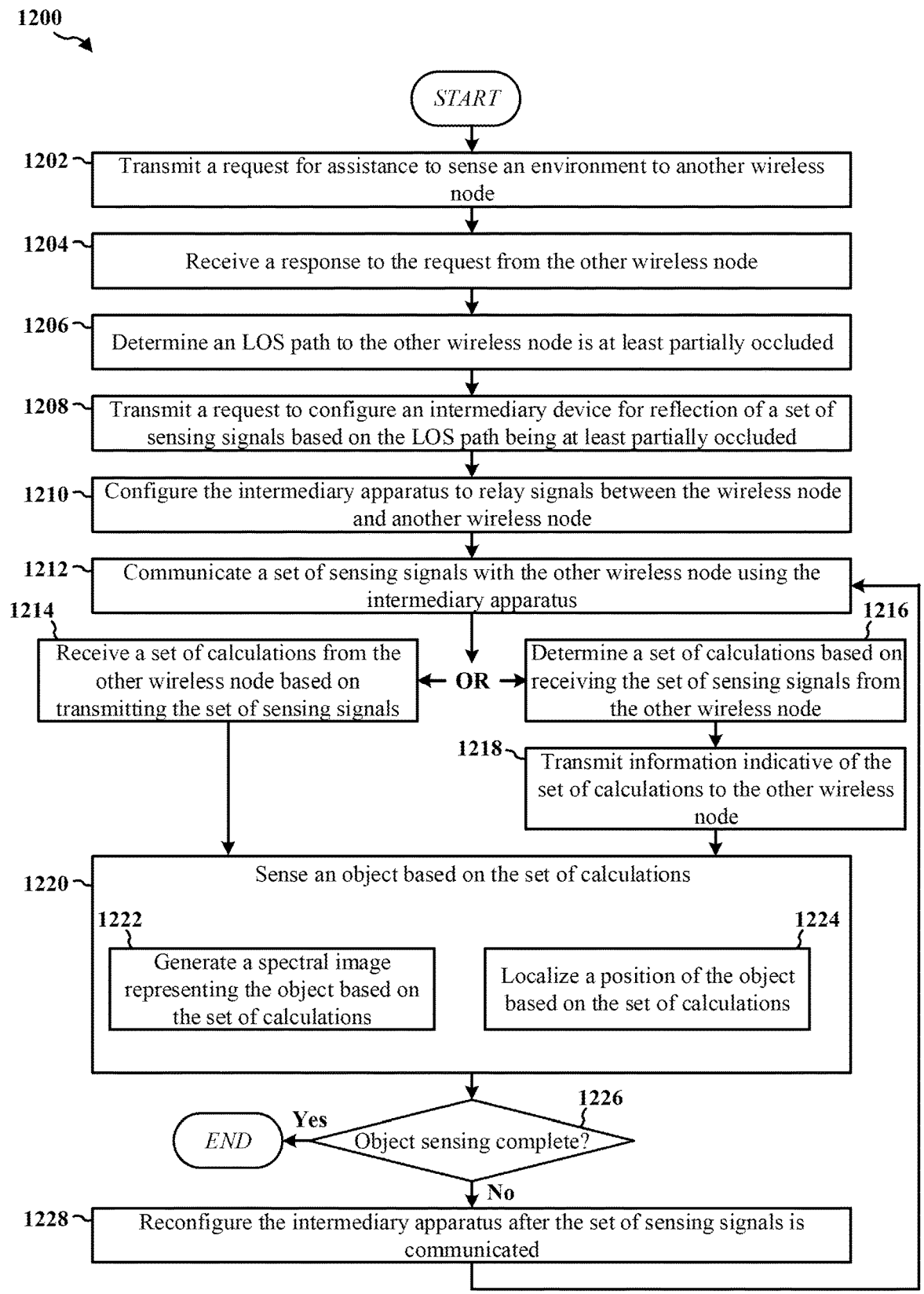
FIG. 12 is a flowchart of another method of bistatic sensing at a wireless node.

FIG. 12 is a flowchart of another method of bistatic sensing at a wireless node. The method may be performed by a UE (e.g., a UE 104, 350, 404, 406, 504, 506), a base station (e.g., the base station 102/180, 310, 402), a wireless node (e.g., one of the nodes 604, 606, 652, 656, 704, 706, 804, 806, 904, 906, 1004, 1006), an apparatus (e.g., the apparatus 1302), or at least one component of any of the foregoing. According to different aspects, one or more of the illustrated operations may be transposed, omitted, and/or contemporaneously performed.

At 1202, the wireless node may transmit a request for assistance to sense an environment to another wireless node. At 1204, the wireless node may receive a response to the request from the other wireless node.

At 1206, the wireless node may determine that an LOS path to the other wireless node is at least partially occluded. For example, the wireless node may detect an absence of communication on resources on which the other wireless node had been schedule to communicate with the wireless node, and the wireless node may detect that a duration of the absence of communication exceeds a threshold amount.

At 1208, the wireless node may transmit a request to configure an intermediary apparatus for reflection of a set of sensing signals based on the LOS path being at least partially occluded.

At 1210, the wireless node may configure the intermediary apparatus to relay signals between the wireless node and another wireless node. For example, the wireless node may calculate a pattern according to which various reflective elements of the intermediary apparatus are to be adjusted, and the wireless node may transmit the pattern to the intermediary apparatus.

At 1212, the wireless node may communicate (e.g., transmit or receive) a set of sensing signals with the other wireless node using the intermediary apparatus.

In some aspects, at 1214, the wireless node may receive a set of calculations from the other wireless node based on transmitting the set of sensing signals.

In some other aspects, at 1216, the wireless node may determine a set of calculations based on receiving the set of sensing signals from the other wireless node. For example, the wireless node may detect a ToA associated with at least one of the set of signals, and the wireless node may compare the ToA with an associate to determine if the signal should be filtered out for failing to be reflected of a target object.

At 1218, the wireless node may transmit information indicative of the set of calculations to the other wireless node.

At 1220, the wireless node may sense an object in the environment based on the set of calculations. In some aspects, at 1222, the wireless node made may generate a spectral image representing the object based on the set of calculations. In some other aspects, at the 1224, the wireless node may localize a position of the object based on the set of calculations.

At 1226, the wireless node may determine whether object sensing is complete. For example, the wireless node may aggregate information representative of multiple different regions of the object, and the wireless node may perform bistatic sensing. At 1228, the wireless node may reconfigure the intermediary apparatus after the set of sensing signals is communicated.

Figure 13:
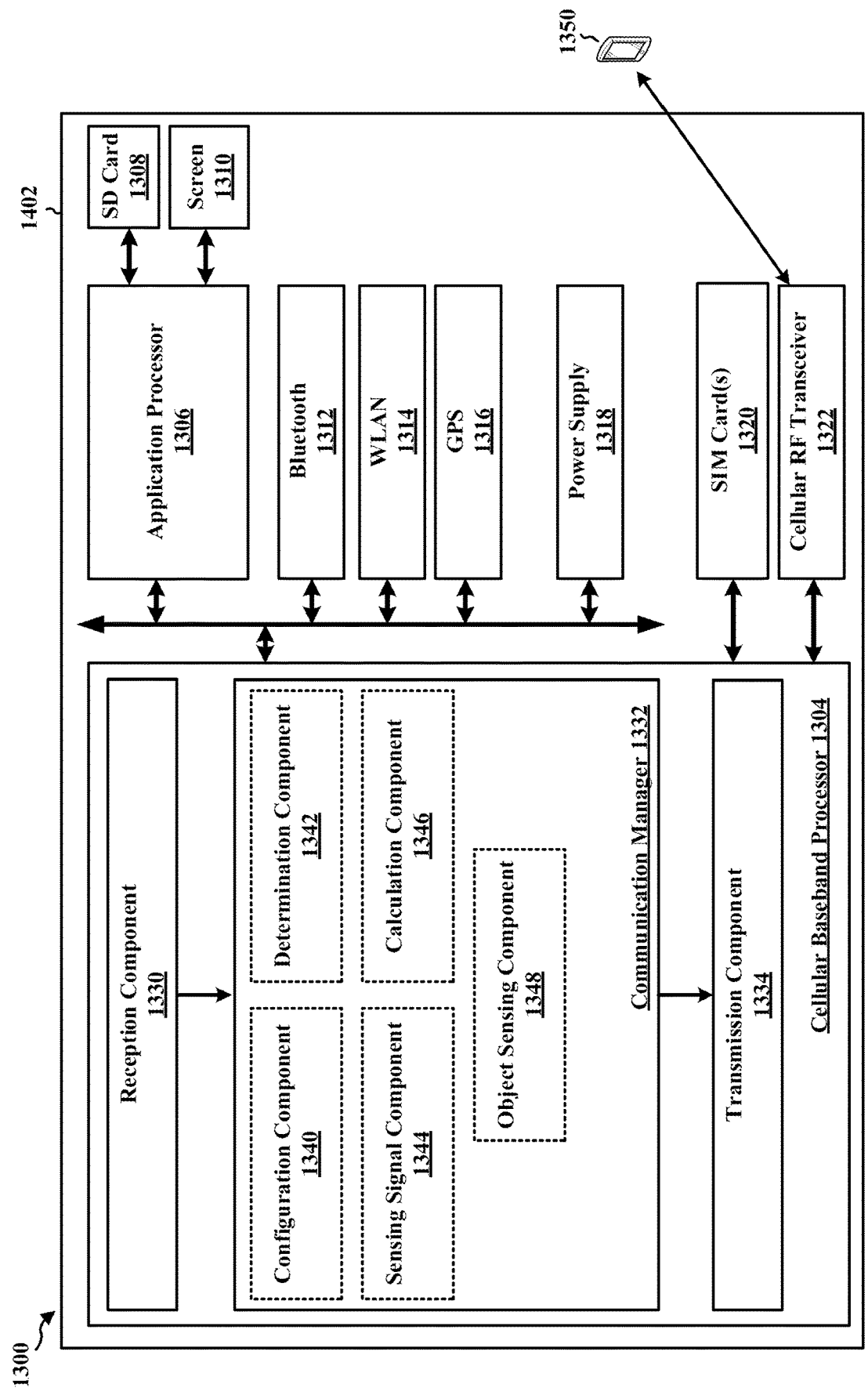
FIG. 13 is a diagram illustrating an example of a hardware implementation for an example apparatus.

FIG. 13 is a diagram 1300 illustrating an example of a hardware implementation for an apparatus 1302. The apparatus 1302 may be a wireless node, such as a UE, a base station, or a component of one of the foregoing, or a similar device. The apparatus 1302 may include, inter alia, a cellular baseband processor 1304 (also referred to as a modem) and/or a cellular RF transceiver 1322, which may be coupled together and/or integrated into the same package or module.

In some aspects, the apparatus 1302 may accept or may include one or more subscriber identity modules (SIM) cards 1320, which may include one or more integrated circuits, chips, or similar circuitry, and which may be removable or embedded. The one or more SIM cards 1320 may carry identification and/or authentication information, such as an international mobile subscriber identity (IMSI) and/or IMSI-related key(s). Further, the apparatus 1302 may include one or more of an application processor 1306 coupled to a secure digital (SD) card 1308 and a screen 1310, a Bluetooth module 1312, a wireless local area network (WLAN) module 1314, a Global Positioning System (GPS) module 1316, and/or a power supply 1318.

The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304.

In the context of FIG. 3, the cellular baseband processor 1304 may be a component of the UE 350 and may include the memory 360 and/or at least one of the TX processor 368, the RX processor 356, and/or the controller/processor 359. In one configuration, the apparatus 1302 may be a modem chip and/or may be implemented as the baseband processor 1304, while in another configuration, the apparatus 1302 may be the entire UE (e.g., the UE 350 of FIG. 3) and may include some or all of the abovementioned modules, components, and/or circuitry illustrated in the context of the apparatus 1302. In one configuration, the cellular RF transceiver 1322 may be implemented as at least one of the transmitter 354TX and/or the receiver 354RX.

The reception component 1330 may be configured to receive signaling on a wireless channel, such as signaling from a base station 102/180 or UE 104. The transmission component 1334 may be configured to transmit signaling on a wireless channel, such as signaling to a base station 102/180 or UE 104. The communication manager 1332 may coordinate or manage some or all wireless communications by the apparatus 1302, including across the reception component 1330 and the transmission component 1334.

The reception component 30 may provide some or all data and/or control information included in received signaling to the communication manager 1332, and the communication manager 1332 may generate and provide some or all of the data and/or control information to be included in transmitted signaling to the transmission component 1334. The communication manager 1332 may include the various illustrated components, including one or more components configured to process received data and/or control information, and/or one or more components configured to generate data and/or control information for transmission.

The communication manager 1332 may include, inter alia, a configuration component 1340, a determination component 1342, a sensing signal component 1344, a calculation component 1346, or an object sensing component 1348.

The transmission component 1334 may be configured to transmit a request for assistance to sense an environment to another wireless node 1350, e.g., as described in connection with 1202 of FIG. 12. The reception component 1330 may receive a response to the request from the other wireless node 1350, e.g., as described in connection with 1204 of FIG. 12.

The determination component 1342 determine that an LOS path to the other wireless node 1350 is at least partially occluded, e.g., as described in connection with 1206 of FIG. 12. The transmission component 1334 may transmit a request to configure an intermediary apparatus for reflection of a set of sensing signals based on the LOS path being at least partially occluded, e.g., as described in connection with 1208 of FIG. 12.

The configuration component 1340 may configure the intermediary apparatus to relay signals between the apparatus 1302 and another wireless node 1350, e.g., as described in connection with 1210 of FIG. 12. For example, the configuration component 1340 may calculate a pattern according to which various reflective elements of the intermediary apparatus are to be adjusted, and the transmission component 1334 may transmit the pattern to the intermediary apparatus.

The sensing signal component 1344 may communicate (e.g., transmit or receive) a set of sensing signals with the other wireless node 1350 using the intermediary apparatus, e.g., as described in connection with 1212 of FIG. 12.

In some aspects, the reception component 1330 may receive a set of calculations from the other wireless node 1350 based on transmitting the set of sensing signals, e.g., as described in connection with 1214 of FIG. 12.

In some other aspects, the calculation component 1346 may determine a set of calculations based on receiving the set of sensing signals from the other wireless node 1350, e.g., as described in connection with 1216 of FIG. 12. For example, the calculation component 1346 may detect a ToA associated with at least one of the set of signals, and the calculation component 1346 may compare the ToA with an associate to determine if the signal should be filtered out for failing to be reflected of a target object.

The transmission component 1334 may transmit information indicative of the set of calculations to the other wireless node 1350, e.g., as described in connection with 1218 of FIG. 12.

The object sensing component 1348 may sense an object in the environment based on the set of calculations, e.g., as described in connection with 1220 of FIG. 12. In some aspects, the object sensing component 1348 made may generate a spectral image representing the object based on the set of calculations, e.g., as described in connection with 1222 of FIG. 12. In some other aspects, the object sensing component 1348 may localize a position of the object based on the set of calculations, e.g., as described in connection with 1224 of FIG. 12.

The object sensing component 1348 may determine whether object sensing is complete, e.g., as described in connection with 1226 of FIG. 12. For example, the object sensing component 1348 may aggregate information representative of multiple different regions of the object, and the object sensing component 1348 may perform bistatic sensing.

The configuration component 1340 may reconfigure the intermediary apparatus after the set of sensing signals is communicated, e.g., as described in connection with 1228 of FIG. 12.

The apparatus 1302 may include additional components that perform some or all of the blocks, operations, signaling, etc. of the algorithm(s) in the aforementioned call flow diagram(s) and/or flowchart(s) of FIGS. 11 and 12. As such, some or all of the blocks, operations, signaling, etc. in the aforementioned call flow diagram(s) and/or flowchart(s) of FIGS. 11 and 12 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for configuring an intermediary apparatus to reflect signals between the wireless node and another wireless node; means for communicating a set of sensing signals with the other wireless node using the intermediary apparatus; and sensing an object based on a set of calculations associated with the set of sensing signals.

In one configuration, the means for configuring the intermediary apparatus is configured to: transmit, to the intermediary apparatus, a set of reflection coefficients to be applied to a set of electrically controllable reflective elements at a RIS of the intermediary apparatus.

In one configuration, the apparatus 1302, and in particular the cellular baseband processor 1304, includes means for transmitting a request for assistance to sense an environment to the other wireless node; and means for receiving a response to the request from the other wireless node, and the set of sensing signals is communicated with the other wireless node based on the response.

In one configuration, the request indicates at least one of a configuration for the set of sensing signals, a position of the wireless node, a control protocol associated with the intermediary apparatus, or a beam sweep pattern for communication of the set of sensing signals, and the response indicates at least one of an acceptance of the request to sense the environment or a position of the other wireless node.

In one configuration, the apparatus 1302, and in particular the cellular baseband processor 1304, includes means for determining a LOS path to the other wireless node is at least partially occluded; and means for transmitting a request to configure the intermediary apparatus for reflection of the set of sensing signals based on the LOS path to the other wireless node being at least partially occluded.

In one configuration, the set of calculations includes at least one of a ToA associated with at least one of the set of sensing signals, an AoA associated with the at least one of the set of sensing signals, a TDoA between at least two of the set of sensing signals, a position of the object, or a CIR on at least one communication channel.

In one configuration, the apparatus 1302, and in particular the cellular baseband processor 1304, includes means for receiving the set of calculations from the other wireless node based on transmitting the set of sensing signals.

In one configuration, the apparatus 1302, and in particular the cellular baseband processor 1304, includes means for determining the set of calculations based on receiving the set of sensing signals from the other wireless node; and means for transmitting the set of calculations to the other wireless node.

In one configuration, the means for sensing the object based on the set of calculations associated with the set of sensing signals is configured to: generate a spectral image representing the object based on the set of calculations associated with the set of sensing signals.

In one configuration, the means for sensing the object based on the set of calculations associated with the set of sensing signals is configured to: localize a position of the object based on the set of calculations associated with the set of sensing signals, and the position includes at least one of a distance relative to a position of the wireless node, a distance relative to a position of the other wireless node, a set of coordinates indicating a position of the object with respect to a relative frame of reference, or a set of geographic coordinates.

In one configuration, the apparatus 1302, and in particular the cellular baseband processor 1304, includes means for reconfiguring the intermediary apparatus after the set of sensing signals is communicated; and means for communicating another set of sensing signals after the intermediary apparatus is reconfigured, and a first region of the object is sensed based on the set of calculations associated with the set of sensing signals and a second region of the object is sensed based on another set of calculations associated with the other set of sensing signals.

In some aspects, the aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

In some other aspects, the aforementioned means may be one or more of the aforementioned components of the apparatus 1302 configured to perform the functions recited by the aforementioned means. As described supra, the apparatus_1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The specific order or hierarchy of blocks or operations in each of the foregoing processes, flowcharts, and other diagrams disclosed herein is an illustration of example approaches. Based upon design preferences, one of ordinary skill will readily recognize that the specific order or hierarchy of blocks each the processes, flowcharts, and other diagrams may be rearranged, omitted, and/or contemporaneously performed without departing from the scope of the present disclosure. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a wireless node, comprising: configuring an intermediary apparatus to reflect signals between the wireless node and another wireless node; communicating a set of sensing signals with the other wireless node using the intermediary apparatus; and sensing an object based on a set of calculations associated with the set of sensing signals.

Example 2 includes the method of example 1, wherein configuring the intermediary apparatus comprises: transmitting, to the intermediary apparatus, a set of reflection coefficients to be applied to a set of electrically controllable reflective elements at a reconfigurable intelligent surface (RIS) of the intermediary apparatus.

Example 3 includes the method of example 1, further comprising: transmitting a request for assistance to sense an environment to the other wireless node; and receiving a response to the request from the other wireless node, wherein the set of sensing signals is communicated with the other wireless node based on the response.

Example 4 includes the method of example 3, wherein the request indicates at least one of a configuration for the set of sensing signals, a position of the wireless node, a control protocol associated with the intermediary apparatus, or a beam sweep pattern for communication of the set of sensing signals, and wherein the response indicates at least one of an acceptance of the request to sense the environment or a position of the other wireless node.

Example 5 includes the method of example 3, further comprising: determining a line-of-sight (LOS) path to the other wireless node is at least partially occluded; and transmitting a request to configure the intermediary apparatus for reflection of the set of sensing signals based on the LOS path to the other wireless node being at least partially occluded.

Example 6 includes the method of example 1, wherein the set of calculations comprises at least one of a time of arrival (ToA) associated with at least one of the set of sensing signals, an angle of arrival (AoA) associated with the at least one of the set of sensing signals, a time difference of arrival (TDoA) between at least two of the set of sensing signals, a position of the object, or a channel impulse response (CIR) on at least one communication channel.

Example 7 includes the method of example 6, further comprising: receiving the set of calculations from the other wireless node based on transmitting the set of sensing signals.

Example 8 includes the method of example 6, further comprising: determining the set of calculations based on receiving the set of sensing signals from the other wireless node; and transmitting the set of calculations to the other wireless node.

Example 9 includes the method of example 1, wherein sensing the object based on the set of calculations associated with the set of sensing signals comprises: generating a spectral image representing the object based on the set of calculations associated with the set of sensing signals.

Example 10 includes the method of example 1, wherein sensing the object based on the set of calculations associated with the set of sensing signals comprises: localizing a position of the object based on the set of calculations associated with the set of sensing signals, wherein the position comprises at least one of a distance relative to a position of the wireless node, a distance relative to a position of the other wireless node, a set of coordinates indicating a position of the object with respect to a relative frame of reference, or a set of geographic coordinates.

Example 11 includes the method of example 1, further comprising: reconfiguring the intermediary apparatus after the set of sensing signals is communicated; and communicating another set of sensing signals after the intermediary apparatus is reconfigured, wherein a first region of the object is sensed based on the set of calculations associated with the set of sensing signals and a second region of the object is sensed based on another set of calculations associated with the other set of sensing signals.

The previous description is provided to enable any person of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include some communication and/or memory operations/procedures through which some information or value(s) are acquired, such as "receiving" (e.g., receiving information), "accessing" (e.g., accessing data in a memory), "detecting," and the like.

As another example, reference to an element in the singular is not intended to mean "one and only one" unless specifically so stated, but rather "one or more." In particular, reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a wireless node, comprising:
   transmitting a request for assistance to sense an environment to an other wireless node;
   receiving a response to the request from the other wireless node;
   determining a line-of-sight (LOS) path to the other wireless node is at least partially occluded;
   transmitting a request to configure an intermediary apparatus for reflection of a set of sensing signals based on the LOS path to the other wireless node being at least partially occluded;
   configuring the intermediary apparatus to reflect signals between the wireless node and the other wireless node based on the LOS path to the other wireless node being at least partially occluded;
   communicating the set of sensing signals with the other wireless node using the intermediary apparatus;
   determining a distance between 1) the wireless node and the intermediary apparatus, or 2) The wireless node and the other wireless node; and
   sensing an object based on a set of calculations associated with the set of sensing signals,
   wherein the set of calculations comprises a time difference of arrival (TDoA) between at least two of the set of sensing signals.

2. The method of claim 1, wherein configuring the intermediary apparatus comprises:
   transmitting, to the intermediary apparatus, a set of reflection coefficients to be applied to a set of electrically controllable reflective elements at a reconfigurable intelligent surface (RIS) of the intermediary apparatus.

3. The method of claim 1, wherein
   the set of sensing signals is communicated with the other wireless node based on the response.

4. The method of claim 3, wherein the request indicates at least one of a configuration for the set of sensing signals, a position of the wireless node, a control protocol associated with the intermediary apparatus, or a beam sweep pattern for communication of the set of sensing signals, and wherein the response indicates at least one of an acceptance of the request to sense the environment or a position of the other wireless node.

5. The method of claim 1, wherein the set of calculations further comprises at least one of a time of arrival (ToA) associated with at least one of the set of sensing signals, an angle of arrival (AoA) associated with the at least one of the set of sensing signals, a position of the object, or a channel impulse response (CIR) on at least one communication channel.

6. The method of claim 1, further comprising:
   receiving the set of calculations from the other wireless node based on transmitting the set of sensing signals.

7. The method of claim 1, further comprising:
   determining the set of calculations based on receiving the set of sensing signals from the other wireless node; and
   transmitting the set of calculations to the other wireless node.

8. The method of claim 1, wherein sensing the object based on the set of calculations associated with the set of sensing signals comprises:
   generating a spectral image representing the object based on the set of calculations associated with the set of sensing signals.

9. The method of claim 1, wherein sensing the object based on the set of calculations associated with the set of sensing signals comprises:
   localizing a position of the object based on the set of calculations associated with the set of sensing signals, wherein
   the position comprises at least one of a distance relative to a position of the wireless node, a distance relative to a position of the other wireless node, a set of coordinates indicating a position of the object with respect to a relative frame of reference, or a set of geographic coordinates.

10. The method of claim 1, further comprising:
    reconfiguring the intermediary apparatus after the set of sensing signals is communicated; and
    communicating another set of sensing signals after the intermediary apparatus is reconfigured, wherein
    a first region of the object is sensed based on the set of calculations associated with the set of sensing signals and a second region of the object is sensed based on another set of calculations associated with the other set of sensing signals.

11. An apparatus for wireless communication at a wireless node, comprising:
a memory; and
at least one processor coupled to the memory and configured to:
transmit a request for assistance to sense an environment to an other wireless node;
receive a response to the request from the other wireless node;
determine a line-of-sight (LOS) path to the other wireless node is at least partially occluded;
transmit a request to configure an intermediary apparatus for reflection of a set of sensing signals based on the LOS path to the other wireless node being at least partially occluded;
configure the intermediary apparatus to reflect signals between the wireless node and the other wireless node based on the LOS path to the other wireless node being at least partially occluded;
communicate the set of sensing signals with the other wireless node using the intermediary apparatus;
determine a distance between 1) the wireless node and the intermediary apparatus, or 2) the wireless node and the other wireless node; and
sense an object based on a set of calculations associated with the set of sensing signals, wherein the set of calculations comprises a time difference of arrival (TDoA) between at least two of the set of sensing signals.

12. The apparatus of claim 11, wherein the configuration of the intermediary apparatus comprises to:
transmit, to the intermediary apparatus, a set of reflection coefficients to be applied to a set of electrically controllable reflective elements at a reconfigurable intelligent surface (RIS) of the intermediary apparatus.

13. The apparatus of claim 11, wherein
the set of sensing signals is communicated with the other wireless node based on the response.

14. The apparatus of claim 13, wherein the request indicates at least one of a configuration for the set of sensing signals, a position of the wireless node, a control protocol associated with the intermediary apparatus, or a beam sweep pattern for communication of the set of sensing signals, and wherein the response indicates at least one of an acceptance of the request to sense the environment or a position of the other wireless node.

15. The apparatus of claim 11, wherein the set of calculations further comprises at least one of a time of arrival (ToA) associated with at least one of the set of sensing signals, an angle of arrival (AoA) associated with the at least one of the set of sensing signals, a position of the object, or a channel impulse response (CIR) on at least one communication channel.

16. The apparatus of claim 11, wherein the at least one processor is further configured to:
receive the set of calculations from the other wireless node based on transmitting the set of sensing signals.

17. The apparatus of claim 11, wherein the at least one processor is further configured to:
determine the set of calculations based on receiving the set of sensing signals from the other wireless node; and
transmit the set of calculations to the other wireless node.

18. The apparatus of claim 11, wherein sensing the object based on the set of calculations associated with the set of sensing signals comprises to:
generate a spectral image representing the object based on the set of calculations associated with the set of sensing signals.

19. The apparatus of claim 11, wherein sensing the object based on the set of calculations associated with the set of sensing signals comprises to:
localize a position of the object based on the set of calculations associated with the set of sensing signals, wherein
the position comprises at least one of a distance relative to a position of the wireless node, a distance relative to a position of the other wireless node, a set of coordinates indicating a position of the object with respect to a relative frame of reference, or a set of geographic coordinates.

20. The apparatus of claim 11, wherein the at least one processor is further configured to:
reconfigure the intermediary apparatus after the set of sensing signals is communicated; and
communicate another set of sensing signals after the intermediary apparatus is reconfigured, wherein
a first region of the object is sensed based on the set of calculations associated with the set of sensing signals and a second region of the object is sensed based on another set of calculations associated with the other set of sensing signals.

21. An apparatus of wireless communication at a wireless node, comprising:
means for transmitting a request for assistance to sense an environment to an other wireless node;
means for receiving a response to the request from the other wireless node;
means for determining a line-of-sight (LOS) path to the other wireless node is at least partially occluded;
means for transmitting a request to configure an intermediary apparatus for reflection of a set of sensing signals based on the LOS path to the other wireless node being at least partially occluded;
means for configuring the intermediary apparatus to reflect signals between the wireless node and the other wireless node based on the LOS path to the other wireless node being at least partially occluded;
means for communicating the set of sensing signals with the other wireless node using the intermediary apparatus;
means for determining a distance between 1) the wireless node and the intermediary apparatus, or 2) the wireless node and the other wireless node; and
means for sensing an object based on a set of calculations associated with the set of sensing signals, wherein the set of calculations comprises a time difference of arrival (TDoA) between at least two of the set of sensing signals.

22. The apparatus of claim 21, wherein the means for configuring the intermediary apparatus is configured to:
transmit, to the intermediary apparatus, a set of reflection coefficients to be applied to a set of electrically controllable reflective elements at a reconfigurable intelligent surface (RIS) of the intermediary apparatus.

23. The apparatus of claim 21, wherein
the set of sensing signals is communicated with the other wireless node based on the response.

24. The apparatus of claim 23, wherein the request indicates at least one of a configuration for the set of sensing signals, a position of the wireless node, a control protocol associated with the intermediary apparatus, or a beam sweep pattern for communication of the set of sensing signals, and wherein the response indicates at least one of an acceptance of the request to sense the environment or a position of the other wireless node.

25. The apparatus of claim 21, wherein the set of calculations further comprises at least one of a time of arrival (ToA) associated with at least one of the set of sensing signals, an angle of arrival (AoA) associated with the at least one of the set of sensing signals, a position of the object, or a channel impulse response (CIR) on at least one communication channel.

26. The apparatus of claim 21, further comprising:
means for receiving the set of calculations from the other wireless node based on transmitting the set of sensing signals.

27. A non-transitory computer-readable medium storing computer-executable code for wireless communication at a wireless node, the code when executed by a processor cause the processor to:
transmit a request for assistance to sense an environment to an other wireless node;
receive a response to the request from the other wireless node;
determine a line-of-sight (LOS) path to the other wireless node is at least partially occluded;
transmit a request to configure an intermediary apparatus for reflection of a set of sensing signals based on the LOS path to the other wireless node being at least partially occluded;
configure the intermediary apparatus to reflect signals between the wireless node and the other wireless node;
communicate the set of sensing signals with the other wireless node using the intermediary apparatus;
determine a distance between 1) the wireless node and the intermediary apparatus, or 2) the wireless node and the other wireless node; and
sense an object based on a set of calculations associated with the set of sensing signals,
wherein the set of calculations comprises a time difference of arrival (TDoA) between at least two of the set of sensing signals.

* * * * *